United States Patent
Kurasawa et al.

(10) Patent No.: US 10,969,920 B2
(45) Date of Patent: Apr. 6, 2021

(54) DISPLAY DEVICE AND DETECTION DEVICE

(71) Applicant: Japan Display Inc., Tokyo (JP)

(72) Inventors: Hayato Kurasawa, Tokyo (JP); Toshinori Uehara, Tokyo (JP); Yuji Suzuki, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/371,946

(22) Filed: Apr. 1, 2019

(65) Prior Publication Data

US 2019/0302967 A1 Oct. 3, 2019

(30) Foreign Application Priority Data

Apr. 3, 2018 (JP) .............................. JP2018-071636

(51) Int. Cl.
*G06F 3/044* (2006.01)
*G06K 9/00* (2006.01)

(52) U.S. Cl.
CPC .. *G06F 3/0448* (2019.05); *G06F 2203/04108* (2013.01); *G06K 9/0002* (2013.01); *G06K 9/00053* (2013.01)

(58) Field of Classification Search
CPC ......... G06F 3/0448; G06F 2203/04108; G06F 3/0445; G06F 3/0412; G06K 9/00053; G06K 9/0002

See application file for complete search history.

(56) References Cited

U.S. PATENT DOCUMENTS

| 2010/0033443 | A1  | 2/2010  | Hashimoto |
|---|---|---|---|
| 2010/0328259 | A1* | 12/2010 | Ishizaki ............... G02F 1/13338 345/174 |
| 2012/0242615 | A1* | 9/2012  | Teraguchi ............. G06F 3/0416 345/174 |
| 2014/0028616 | A1* | 1/2014  | Furutani .............. G09G 3/3607 345/174 |
| 2014/0292709 | A1* | 10/2014 | Mizuhashi ............ G06F 3/0445 345/174 |

(Continued)

FOREIGN PATENT DOCUMENTS

| JP | 2010-039816 A | 2/2010 |
|---|---|---|
| JP | 2014-199605 A | 10/2014 |

*Primary Examiner* — Ibrahim A Khan
(74) *Attorney, Agent, or Firm* — K&L Gates LLP

(57) ABSTRACT

According to an aspect, a display device includes: a first substrate; a second substrate facing the first substrate; a display function layer between the first substrate and the second substrate and displaying an image; first electrodes in a detection region of the first substrate; second electrodes in the detection region above the second substrate; a first electrode selection circuit in a peripheral region outside the detection region of the first substrate; and a second electrode selection circuit in a region overlapping with the peripheral region above the second substrate. The first electrode selection circuit selects some of the first electrodes, and supplies detection drive signals having phases determined on the basis of a certain code to the selected first electrodes. The second electrode selection circuit selects some of the second electrodes on the basis of a certain code, and couples the selected second electrodes to a single output signal line.

16 Claims, 22 Drawing Sheets

(56) References Cited

U.S. PATENT DOCUMENTS

| | | | |
|---|---|---|---|
| 2015/0348486 A1* | 12/2015 | Suzuki | G09G 3/3677 |
| | | | 345/174 |
| 2015/0355765 A1* | 12/2015 | Fukushima | G06F 3/0443 |
| | | | 345/174 |
| 2017/0075448 A1* | 3/2017 | Kang | G06F 1/3262 |
| 2017/0220183 A1* | 8/2017 | Kim | G06F 3/0412 |
| 2018/0039372 A1* | 2/2018 | Cho | G06F 3/0412 |
| 2018/0042127 A1* | 2/2018 | Kim | G06F 3/04164 |
| 2018/0335880 A1* | 11/2018 | Seol | G06F 3/0488 |
| 2019/0302967 A1* | 10/2019 | Kurasawa | G06F 3/0445 |

\* cited by examiner

FIG.12

| PERIOD | ta1 | | | | | | | ta2 | | | | | | | ta3 | | | | | | | ta4 | | | | | | |
|---|---|---|---|---|---|---|---|---|---|---|---|---|---|---|---|---|---|---|---|---|---|---|---|---|---|---|---|---|
| Tx-1 | Vcom-H | | | | | | | Vcom-H | | | | | | | Vcom-H | | | | | | | Vcom-H | | | | | | |
| Tx-2 | Vcom-H | | | | | | | Vcom-L | | | | | | | Vcom-H | | | | | | | Vcom-L | | | | | | |
| Tx-3 | Vcom-H | | | | | | | Vcom-H | | | | | | | Vcom-L | | | | | | | Vcom-L | | | | | | |
| Tx-4 | Vcom-H | | | | | | | Vcom-L | | | | | | | Vcom-L | | | | | | | Vcom-H | | | | | | |
| PERIOD | tb1 | tb2 | tb3 | tb4 | tb5 | tb6 | tb7 | tb1 | tb2 | tb3 | tb4 | tb5 | tb6 | tb7 | tb1 | tb2 | tb3 | tb4 | tb5 | tb6 | tb7 | tb1 | tb2 | tb3 | tb4 | tb5 | tb6 | tb7 |
| Rx-1 | AFE | AFE | VR | AFE | AFE | VR | AFE | AFE | AFE | VR | AFE | VR | AFE | VR | AFE | AFE | AFE | AFE | VR | AFE | VR | AFE | AFE | AFE | AFE | VR | AFE | AFE |
| Rx-2 | AFE | VR | AFE | AFE | VR | VR | AFE | AFE | VR | AFE | AFE | VR | VR | AFE | AFE | AFE | AFE | AFE | VR | VR | AFE | AFE | AFE | AFE | AFE | VR | VR | AFE |
| Rx-3 | AFE | AFE | AFE | VR | AFE | VR | VR | AFE | AFE | VR | VR | AFE | VR | VR | AFE | AFE | VR | VR | AFE | VR | VR | AFE | AFE | AFE | VR | AFE | VR | VR |
| Rx-4 | AFE | VR | AFE | VR | AFE | AFE | VR | AFE | VR | AFE | VR | AFE | AFE | VR | AFE | AFE | VR | VR | AFE | AFE | VR | AFE | AFE | AFE | VR | AFE | AFE | VR |

DISPLAY DEVICE AND DETECTION DEVICE

CROSS-REFERENCE TO RELATED APPLICATIONS

This application claims priority from Japanese Application No. 2018-071636, filed on Apr. 3, 2018, the contents of which are incorporated by reference herein in its entirety.

BACKGROUND

1. Technical Field

The present disclosure relates to a display device and a detection device.

2. Description of the Related Art

Recent years have seen demands for achieving fingerprint detection used for personal authentication, for example, by using a capacitance method, as disclosed in Japanese Patent Application Laid-open Publication No. 2010-39816. In the fingerprint detection, an electrode having a small area is used for the detection, in comparison with a case of detecting contact of a hand or a finger. Even when signals are obtained from small electrodes, code division multiplexing drive can achieve good detection sensitivity. The code division multiplexing drive is a drive method by which a plurality of drive electrodes are selected simultaneously and drive signals having phases to be determined on the basis of a certain code are supplied to the respective selected drive electrodes, as disclosed in Japanese Patent Application Laid-open Publication No. 2014-199605.

When detection electrodes and drive electrodes are provided on an identical substrate, capacitance between the detection electrodes and the drive electrodes increases. This increase may cause deterioration of detection performance.

SUMMARY

According to an aspect of the present disclosure, a display device includes: a first substrate; a second substrate facing the first substrate; a display function layer provided between the first substrate and the second substrate and displaying an image; a plurality of first electrodes provided in a detection region of the first substrate; a plurality of second electrodes provided in the detection region above the second substrate; a first electrode selection circuit provided in a peripheral region outside the detection region of the first substrate; and a second electrode selection circuit provided in a region overlapping with the peripheral region above the second substrate. The first electrode selection circuit selects some of the first electrodes, and supplies detection drive signals having phases determined on the basis of a certain code to the selected first electrodes. The second electrode selection circuit selects some of the second electrodes on the basis of a certain code, and couples the selected second electrodes to a single output signal line.

According to another aspect of the present disclosure, a detection device includes: a first sensor base; a second sensor base facing the first sensor base; a plurality of first electrodes provided in a detection region of the first sensor base; a plurality of second electrodes provided in the detection region of the second sensor base; a first electrode selection circuit provided in a peripheral region outside the detection region of the first sensor base; and a second electrode selection circuit provided in the peripheral region of the second sensor base. The first electrode selection circuit selects some of the first electrodes, and supplies drive signals having phases determined on the basis of a certain code to the selected first electrodes. The second electrode selection circuit selects some of the second electrodes on the basis of a certain code, and couples the selected second electrodes to a single output signal line.

BRIEF DESCRIPTION OF THE DRAWINGS

FIG. 12 is a table illustrating, on a period-to-period basis, a relation between the first electrodes and drive signals and a coupling relation between second electrodes and an analog front end (AFE);

DETAILED DESCRIPTION

Figure 1:
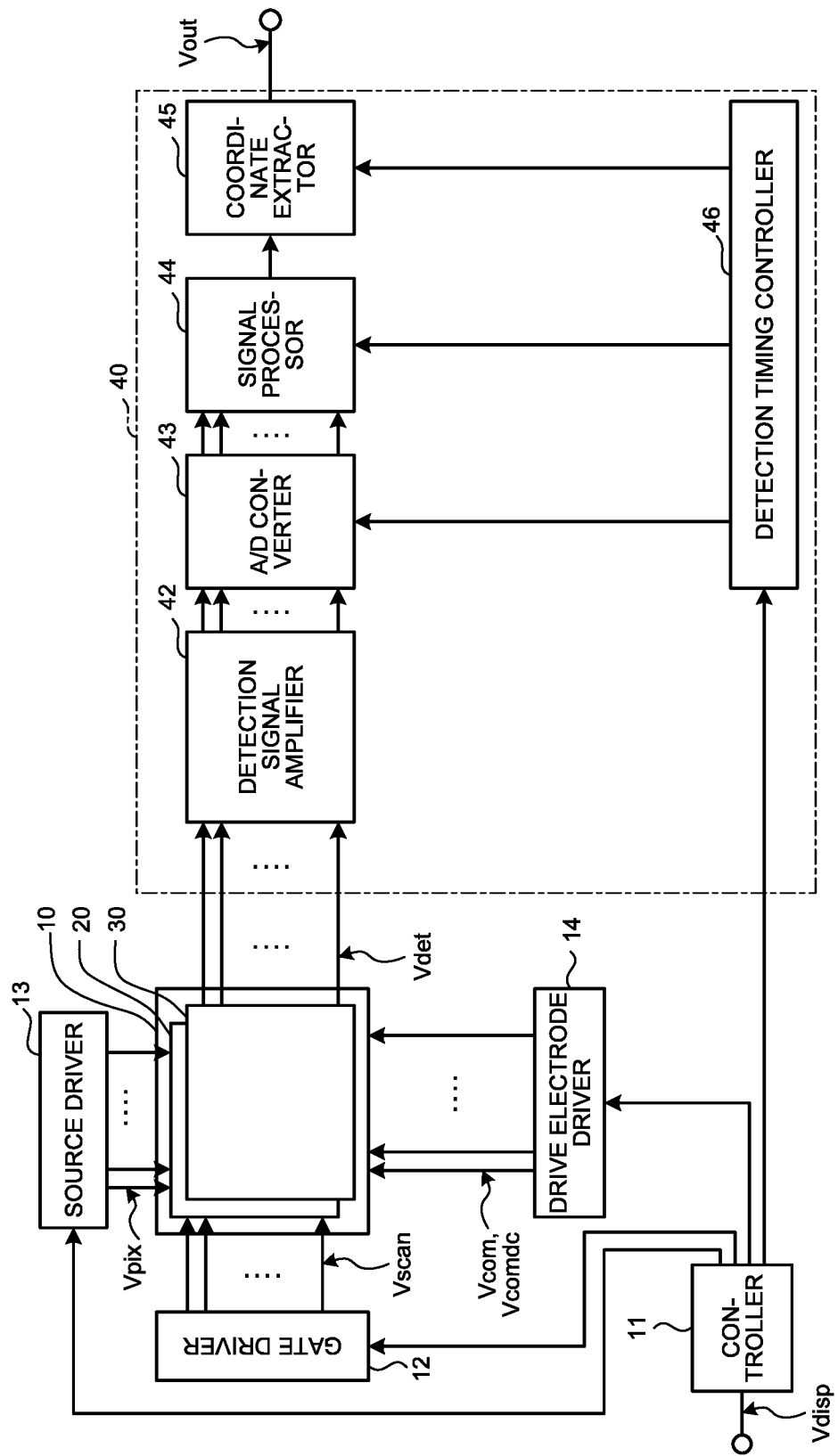
FIG. 1 is a block diagram illustrating an exemplary configuration of a display device according to a first embodiment.

Exemplary aspects (embodiments) to embody the present disclosure are described below in greater detail with reference to the accompanying drawings. The contents described in the embodiments are not intended to limit the present disclosure. Components described below include components easily conceivable by those skilled in the art and components substantially identical therewith. Furthermore, the components described below may be appropriately combined. What is disclosed herein is given by way of example only, and appropriate changes made without departing from the spirit of the present disclosure and easily conceivable by those skilled in the art naturally fall within the scope of the disclosure. To simplify the explanation, the drawings may possibly illustrate the width, the thickness, the shape, and other elements of each unit more schematically than the actual aspect. These elements, however, are given by way of example only and are not intended to limit interpretation of the present disclosure. In the present disclosure and the figures, components similar to those previously described with reference to previous figures are denoted by like reference numerals, and detailed explanation thereof may be appropriately omitted. In this disclosure, when an element A is described as being "on" another element B, the element A can be directly on the other element B, or there can be one or more elements between the element A and the other element B.

First Embodiment

FIG. 1 is a block diagram illustrating an exemplary configuration of a display device according to a first embodiment. This display device 1 includes a display portion 10, a controller 11, a gate driver 12, a source driver 13, a drive electrode driver 14, and a detector 40. The display portion 10 is a device in which a display panel 20 and a detection device 30 are integrated with each other. The display panel 20 is a liquid crystal display device. In the display portion 10, the detection device 30 may be mounted on the display panel 20. The display panel 20 may be an organic light emitting diode (OLED) panel, for example. Alternatively, the display panel 20 may be an electrophoretic display (EPD) panel using electrophoretic elements as display elements. The gate driver 12, the source driver 13, or the drive electrode driver 14 may be provided to the display portion 10.

The display panel 20 is a device that performs display by sequential scanning each one horizontal line in accordance with a scanning signal Vscan supplied from the gate driver 12. The controller 11 is a circuit (control device) that controls the gate driver 12, the source driver 13, the drive electrode driver 14, and the detector 40. The controller 11 supplies a control signal to each of the gate driver 12, the source driver 13, the drive electrode driver 14, and the detector 40 in accordance with a video signal Vdisp externally supplied.

The gate driver 12 sequentially selects one horizontal line serving as a target of display drive of the display portion 10 in accordance with the control signal supplied from the controller 11.

The source driver 13 is a circuit that supplies a pixel signal Vpix to each sub-pixel SPix (refer to FIG. 8) of the display portion 10 in accordance with the control signal supplied from the controller 11.

The drive electrode driver 14 is a circuit that supplies drive signals Vcom or display drive signals Vcomdc to a plurality of first electrodes Tx (refer to FIG. 4) of the display portion 10 in accordance with the control signals supplied from the controller 11.

The detection device 30 performs touch detection by sequential scanning each one detection block in accordance with the drive signals Vcom supplied from the drive electrode driver 14. The detection device 30 performs detection by code division multiplexing drive (hereinafter referred to as the CDM drive). First electrode selection circuits 15 (refer to FIG. 4) each select a plurality of first electrodes Tx simultaneously. The first electrode selection circuits 15 each supply drive signals Vcom having phases determined on the basis of a certain code to the respective selected first electrodes Tx. The detection device 30 detects ridges and valleys of a surface of a finger or a hand that is in contact with or in proximity to the display portion 10 based on a detection principle of a mutual capacitance detection method, thereby detecting a shape of a fingerprint or a palmprint.

The detection device 30 can also detect a position of a finger that is in contact with or in proximity to the display portion 10 in accordance with the drive signals Vcom by time division multiplexing drive (hereinafter referred to as the TDM drive). In the TDM drive, the detection device 30 can perform detection in the entirety of a detection region AA by scanning each one first electrode block BK including a plurality of first electrodes Tx.

The detector 40 is a circuit that detects presence or absence of a touch by a fine pitch in accordance with the control signals supplied from the controller 11 and detection signals Vdet supplied from the detection device 30 of the display portion 10. The detector 40 includes a detection signal amplifier 42, an analog-digital (A/D) converter 43, a signal processor 44, a coordinate extractor 45, and a detection timing controller 46.

The detection signal amplifier 42 amplifies the detection signals Vdet supplied from the detection device 30. The A/D converter 43 samples each analog signal output from the detection signal amplifier 42 and converts the analog signal into a digital signal at a timing synchronized with the drive signal Vcom.

The signal processor 44 is a logic circuit that detects presence or absence of a touch to the display portion 10 in accordance with signals output from the A/D converter 43. The signal processor 44 receives detection signals Vdet from the first electrode Tx and computes third detection signals Vdet3 (refer to FIG. 10). The signal processor 44 receives the computed third detection signals Vdet3 and performs decoding processing on the basis of the certain code.

The detector 40 detects presence or absence of a touch in accordance with the control signals supplied from the controller 11 and the detection signals Vdet supplied from the detection device 30 in the TDM drive. In the TDM drive, the signal processor 44 receives the detection signals Vdet via a second electrode selection circuit 16 (refer to FIG. 5). The signal processor 44 performs processing to extract a signal (absolute value $|\Delta V|$) of a difference between the detection signals Vdet caused by the finger. The signal processor 44 compares the absolute value $|\Delta V|$ with a certain threshold voltage. When the absolute value $|\Delta V|$ is smaller than the threshold voltage, the signal processor 44 determines that an external proximity object is in a non-contact state. When the absolute value $|\Delta V|$ is equal to or larger than the threshold voltage, the signal processor 44 determines that the external proximity object is in a contact state.

The coordinate extractor 45 is a logic circuit that obtains touch panel coordinates at the detection when the signal processor 44 detects a touch. The coordinate extractor 45 outputs the touch panel coordinates as an output signal Vout. The coordinate extractor 45 may output the detection signals Vdet as a sensor output Vo without calculating the touch panel coordinates. The coordinate extractor 45 may output the output signal Vout to the controller 11. The controller 11 can perform certain display operation or detection operation in accordance with the output signal Vout.

Figure 2:
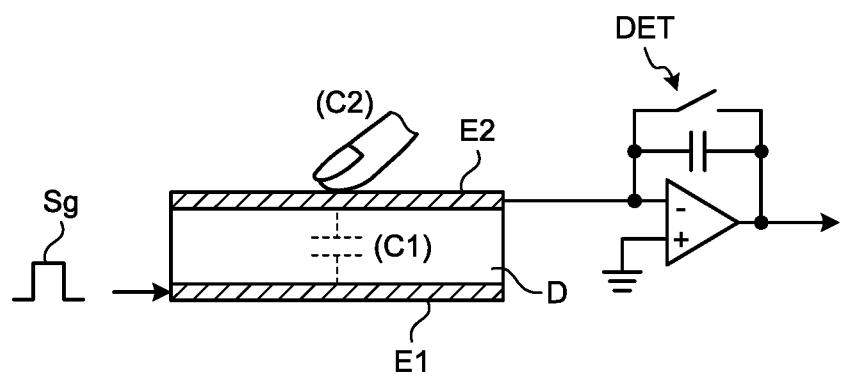
FIG. 2 is a diagram for explaining a basic principle of mutual capacitance touch detection.

The detection device 30 operates on the basis of a basic principle of capacitive proximity detection. The following describes a basic principle of mutual capacitance touch detection by the display device 1 in the embodiment with reference to FIG. 2. FIG. 2 is a diagram for explaining the basic principle of mutual capacitance touch detection. FIG. 2 illustrates a detection circuit together.

As illustrated in FIG. 2, a capacitance element C1 includes a drive electrode E1 and a detection electrode E2, which are a pair of electrodes facing each other with a dielectric body D interposed therebetween. The capacitance element C1 generates fringe lines of electric force extending from ends of the drive electrode E1 to the upper surface of the detection electrode E2, in addition to lines of electric force (not illustrated) generated between the facing surfaces of the drive electrode E1 and the detection electrode E2. One end of the capacitance element C1 is coupled to an alternating current signal source (drive signal source), while the other end of the capacitance element C1 is coupled to a voltage detector DET. The voltage detector DET is, for example, an integration circuit included in the detector 40 illustrated in FIG. 1.

When an alternating current rectangular wave Sg having a certain frequency (e.g., in a range from several KHz to several hundred KHz) is applied to the drive electrode E1 (one end of the capacitance element C1) from the alternating current signal source. A current corresponding to a capacitance value of the capacitance element C1 flows in the voltage detector DET. The voltage detector DET converts a change in current according to the alternating current rectangular wave Sg into a change in voltage.

In the contact state, as illustrated in FIG. 2, capacitance C2 generated by the finger is in contact with or proximate enough to the detection electrode E2 so as to be equated with contact. Accordingly, the fringe lines of electric force between the drive electrode E1 and the detection electrode E2 are blocked by a conductor (finger). As a result, the capacitance element C1 acts as a capacitance element having a capacitance value smaller than that in the non-contact state.

An amplitude of a voltage signal output from the voltage detector DET in the contact state is smaller than that in the non-contact state. An absolute value |ΔV| of a difference in voltage changes in accordance with the influence of a target object that is in contact with or in proximity to the display portion 10. The detector 40 determines ridges and valleys, for example, of the finger on the basis of the absolute value |ΔV|. The detector 40 determines whether the target object is in the non-contact state, in the contact state, or in a proximity state by comparing the absolute value |ΔV| with a certain threshold voltage. In this manner, the detector 40 can detect a touch on the basis of the principle of mutual capacitance touch detection. The "contact state" includes a state where the finger is in contact with the detection surface or proximate enough to the detection surface so as to be equated with contact. The "non-contact state" includes a state where the finger is neither in contact with the detection surface nor proximate enough to the detection surface so as to be equated with contact.

Figure 3:
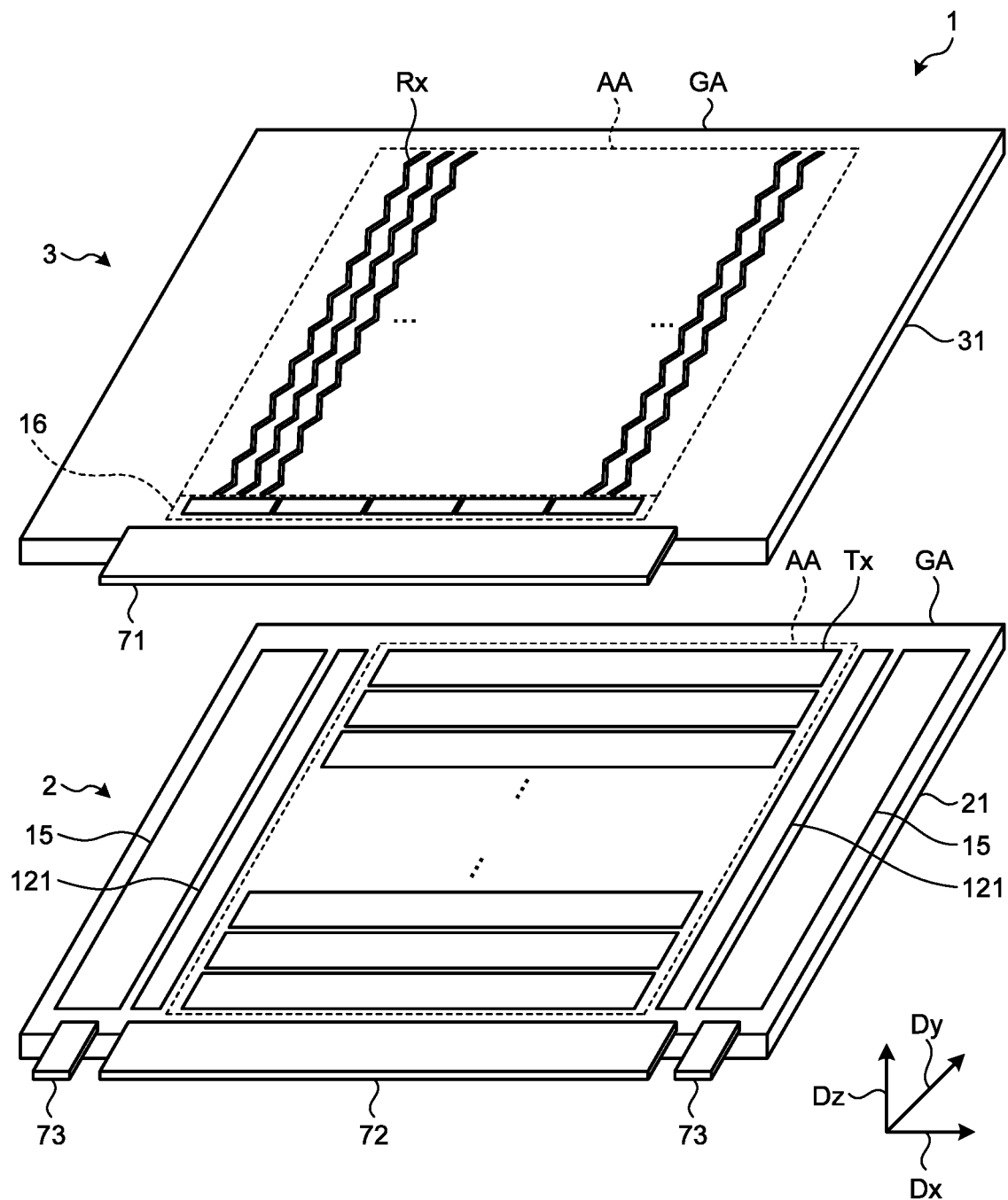
FIG. 3 is an explode perspective view of the display device.
Figure 4:
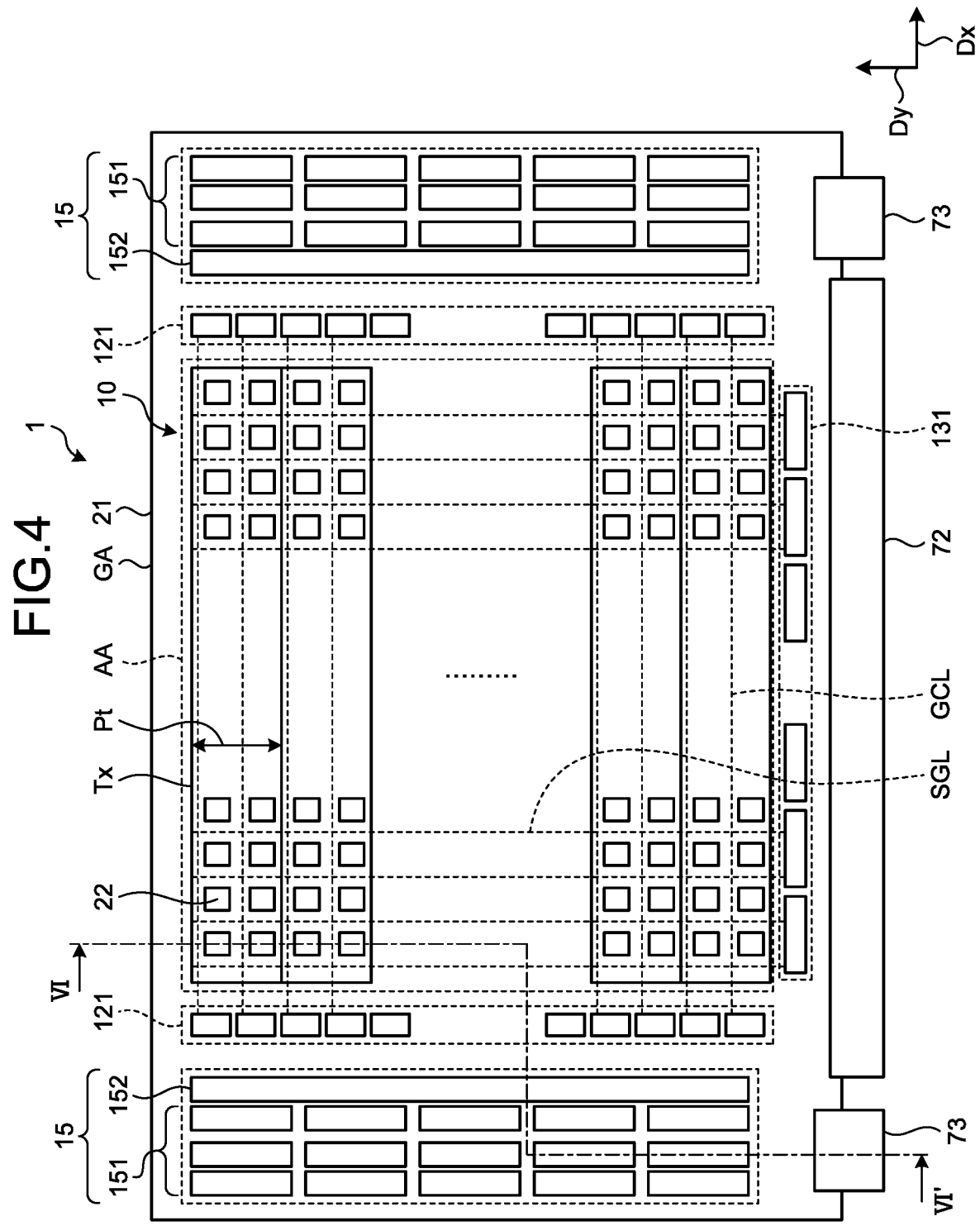
FIG. 4 is a plan view schematically illustrating a first substrate.
Figure 5:
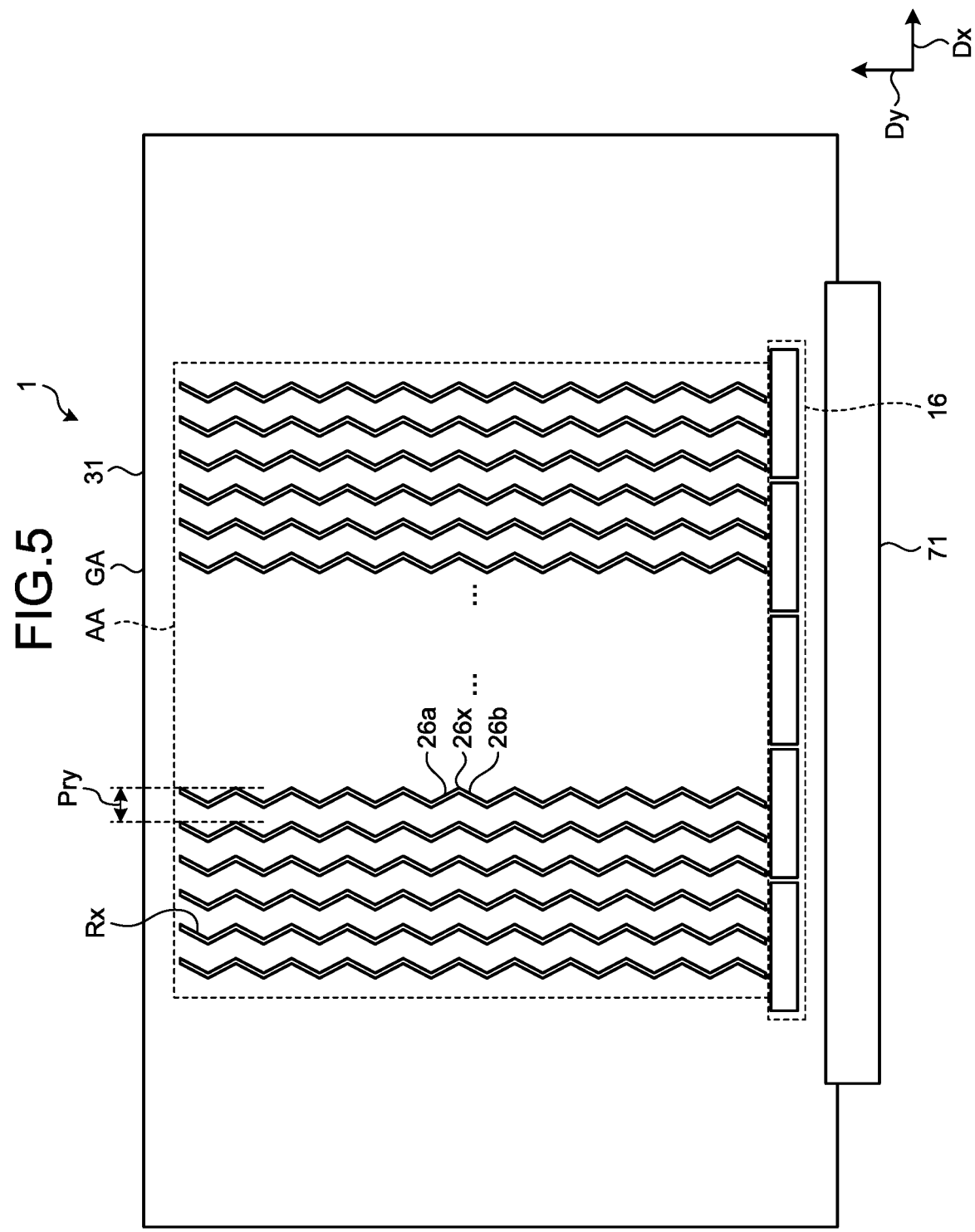
FIG. 5 is a plan view schematically illustrating a second substrate.
Figure 6:
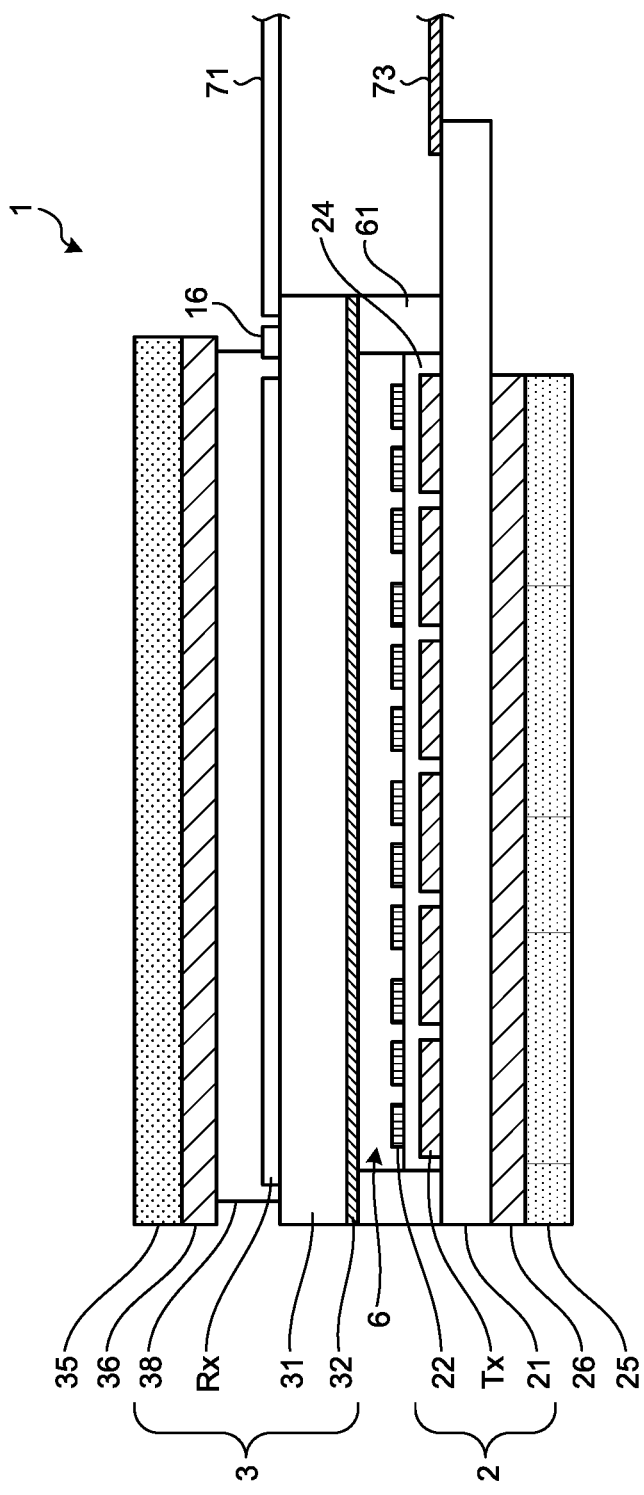
FIG. 6 is a cross-sectional view along line VI-VI' in FIG. 4 of the display device.

The following describes an exemplary configuration of the display device 1 in the present embodiment. FIG. 3 is an explode perspective view of the display device. FIG. 4 is a plan view schematically illustrating a first substrate. FIG. 5 is a plan view schematically illustrating a second substrate. FIG. 6 is a cross-sectional view along line VI-VI' in FIG. 4 of the display device.

As illustrated in FIG. 6, the display device 1 includes a pixel substrate 2, a counter substrate 3, a liquid crystal layer 6, and polarizing plates 25 and 35. The counter substrate 3 is arranged in a direction perpendicular to a surface of the pixel substrate 2 such that the counter substrate 3 faces the pixel substrate 2. The liquid crystal layer 6 is provided between the pixel substrate 2 and the counter substrate 3.

The pixel substrate 2 includes a first substrate 21, a plurality of pixel electrodes 22, and a plurality of first electrodes Tx. The first substrate 21 is provided with circuits such as gate line selection circuits 121 (refer to FIG. 4) included in the gate driver 12 and a signal line selection circuit 131 (refer to FIG. 4) included in the source driver 13. The first substrate 21 is provided with thin film transistor (TFT) elements Tr such as TFTs, and various wires such as gate lines GCL and signal lines SGL (refer to FIG. 8). The first substrate 21 is provided with the first electrode selection circuits 15 (refer to FIG. 4). The pixel electrodes 22 are arrayed in a matrix (row-column configuration) above the first substrate 21. The first electrodes Tx are provided between the first substrate 21 and the pixel electrodes 22. The pixel electrodes 22 and the first electrodes Tx are insulated from each other with an insulation layer 24 interposed therebetween. The polarizing plate 25 is provided below the first substrate 21 with an adhesive layer 26 interposed therebetween. While the present embodiment has been described using an example in which the pixel electrodes 22 are provided above the first electrodes Tx, the first electrodes Tx may be provided above the pixel electrodes 22.

The counter substrate 3 includes a second substrate 31, a plurality of second electrodes Rx, and a color filter 32. The second electrodes Rx, which are detection electrodes of the detection device 30, are provided on one surface of the second substrate 31. The color filter 32 is provided on the other surface of the second substrate 31. A protection layer 38 is provided on the second electrodes Rx. The protection layer 38 can be made of a light transmissive resin such as an acrylic resin. The polarizing plate 35 is provided above the protection layer 38 with an adhesive layer 36 interposed therebetween. The second substrate 31 is provided with the second electrode selection circuit 16. The first substrate 21 and the second substrate 31 are glass substrates having a light transmitting property that allows the substrates to transmit visible light. Alternatively, the second substrate 31 may be a light transmissive resin substrate or a light transmissive resin film made of a resin such as polyimide.

The first substrate 21 is provided with a flexible substrate 73. The first substrate 21 is coupled to an external drive integrated circuit (IC) via the flexible substrate 72. The drive IC includes all of or part of functions of the controller 11 illustrated in FIG. 1. The second substrate 31 is provided with a flexible substrate 71. The second substrate 31 is coupled to an external touch IC via the flexible substrate 71. The touch IC includes all of or part of functions of the detector 40 illustrated in FIG. 1. The drive IC and the touch IC are provided to an external control substrate. At least one of the drive IC and the touch IC may be provided to the first substrate 21.

In the present specification, "above" indicates a direction from the first substrate 21 toward the second substrate 31 in the direction perpendicular to the surface of the first substrate 21. "Below" indicates a direction from the second substrate 31 toward the first substrate 21 in the direction perpendicular to the surface of the first substrate 21. "Plan view" indicates a view from the direction perpendicular to the surface of the first substrate 21.

The first substrate 21 and the second substrate 31 face each other with a certain distance formed by a sealant 61 interposed therebetween. The liquid crystal layer 6 is provided in a space surrounded by the first substrate 21, the second substrate 31, and the sealant 61. The liquid crystal layer 6 modulates light passing through it in accordance with a state of an electric filed. The liquid crystal layer 6 employs liquid crystal in a lateral electric field mode such as a fringe field switching (FFS) mode or an in-plane switching (IPS) mode, for example. The liquid crystal layer 6 is provided as a display function layer that displays images. An orientation film may be disposed between the liquid crystal layer 6 and the pixel substrate 2, and between the liquid crystal layer 6 and the counter substrate 3 in the configuration illustrated in FIG. 6.

As illustrated in FIGS. 3 and 4, the first substrate 21 has the detection region AA of the detection device 30 (refer to FIG. 1) and a region corresponding to a peripheral region GA provided outside the detection region AA. The detection region AA is provided in the region overlapping with a display region of the display panel 20. That is, the detection region AA overlaps with a plurality of pixels Pix (refer to FIG. 8). The first electrodes Tx, which are provided in the detection region AA, extend in a first direction Dx and are arrayed in a second direction Dy. The first electrodes Tx are made of a light transmissive conductive material such as indium tin oxide (ITO). The pixel electrodes 22 overlap with the first electrodes Tx in the plan view. The multiple gate lines GCL extend in the first direction Dx and are arrayed in the second direction Dy. The signal lines SGL extend in the second direction Dy and are arrayed in the first direction Dx. The pixel electrodes 22 are provided in regions surrounded by the gate lines GCL and the signal lines SGL.

The first direction Dx is a direction in a plane in parallel with the first substrate 21, for example, a direction in parallel with one side of the detection region AA. The second direction Dy is a direction in a plane in parallel with the first substrate 21m, and is perpendicular to the first direction Dx. The second direction Dy may intersect the first direction Dx without being perpendicular to the first direction Dx. A third direction Dz is perpendicular to the first direction Dx and the second direction Dy.

As illustrated in FIG. 4, an arrangement width of the first electrode Tx in the second direction Dy is defined as Pt. The arrangement width Pt is about half an arrangement interval Pry of bent portions 26x of the second electrodes Rx (refer to FIG. 5). The present disclosure is not limited thereto, and the arrangement width Pt may be a value other than values half-integer multiple of the arrangement interval Pry. The arrangement width Pt is, for example, from 20 ηm to 100 ηm inclusive. Two pixel electrodes 22 are arranged in the second direction Dy side by side so as to overlap with one first electrode Tx. That is, the first electrode Tx has the width equal to the widths of two pixels Pix.

The peripheral region GA of the first substrate 21 is provided with the gate line selection circuits 121, the signal line selection circuit 131, and the first electrode selection circuits 15. The gate line selection circuit 121 selects the gate line GCL. The gate line selection circuits 121 are each provided at a position adjacent to the edges of the first electrodes Tx in the peripheral region GA. The signal line selection circuit 131 selects the signal line SGL. The signal line selection circuit 131 is provided along the extending direction of the first electrodes Tx in the peripheral region GA.

The first electrode selection circuits 15 each select some of the first electrodes Tx and supply the drive signals Vcom having phases determined on the basis of the certain code to the respective selected first electrodes Tx. The first electrode selection circuits 15 each include a first code generation circuit 151 and a drive signal supplying circuit 152. The first electrode selection circuits 15 are each provided at a position adjacent to the edges of the first electrodes Tx in the peripheral region GA. The gate line selection circuit 121 is provided between the first electrode selection circuit 15 and the first electrodes Tx. The first substrate 21 is provided with the flexible substrates 73. The first electrode selection circuits 15 are coupled to the controller 11 (refer to FIG. 1) via the flexible substrates 73. The first electrode selection circuit 15 produces the certain code on the basis of the control signal from the controller 11.

As illustrated in FIGS. 3 and 5, the second electrodes Rx are provided in a region overlapping with the detection region AA on the second substrate 31. The second electrodes Rx extend in the second direction Dy and are arrayed in the first direction Dx. The second electrodes Rx extend in a direction intersecting the first electrodes Tx, in the plan view. The second electrodes Rx each have a zigzag line shape and a long side of the second electrodes Rx as a whole is the second direction Dy. The second electrodes Rx each include, for example, a plurality of first linear portions 26a, a plurality of second linear portions 26b, and the bent portions 26x. The second linear portion 26b extends in a direction intersecting the first linear portion 26a. The bent portion 26x couples the first linear portion 26a and the second linear portion 26b.

The first linear portion 26a extends in a direction intersecting the first direction Dx and the second direction Dy. The second linear portion 26b also extends in a direction intersecting the first direction Dx and the second direction Dy. The first linear portion 26a and the second linear portion 26b are symmetric with respect to a virtual line (not illustrated) in parallel with the first direction Dx. In each of the second electrodes Rx, the first linear portion 26a and the second linear portion 26b are alternately coupled in the second direction Dy.

The second electrodes Rx are made of a metallic material such as aluminum or an aluminum alloy. The first electrodes Tx may be made of a metallic material while the second electrodes Rx may be made of ITO. With the second electrodes Rx being made of a metallic material, it is possible to reduce resistance regarding the detection signals Vdet. The shape of the second electrode Rx is not limited to the zigzag shape. The second electrode Rx may have a wave line shape, a linear shape, or a mesh shape, for example. Both the first electrodes Tx and the second electrodes Rx may be made of a metallic material. The metallic first electrodes Tx and second electrodes Rx may have a zigzag shape, a wave line shape, a linear shape, or a mesh shape.

The second electrode selection circuit 16 is provided in the peripheral region GA of the second substrate 31. The second electrode selection circuit 16 selects some of the second electrodes Rx on the basis of the certain code and couples the selected second electrodes Rx to a single first output signal line LA1 (refer to FIG. 11). The second electrode selection circuit 16 is provided at a position adjacent to the edges of the second electrodes Rx in the peripheral region GA. The second electrodes Rx are electrically coupled to the flexible substrate 71 via the second electrode selection circuit 16.

Capacitance is generated at each of intersections of the first electrodes Tx and the second electrodes Rx. In the mutual capacitance touch detection, the first electrode selection circuit 15 selects the first electrodes Tx and simultaneously supplies the drive signals Vcom to the selected first electrodes Tx. Fingerprint detection is performed by output of the detection signals Vdet according to changes in capacitance due to ridges and valleys of a surface of a finger or the like in contact with or in proximity to the display portion 10 from the second electrodes Rx. Touch detection is performed by output of the detection signals Vdet according to changes in capacitance due to ridges and valleys of a surface of a finger or the like in contact with or in proximity to the display portion 10.

In the embodiment, the second electrodes Rx are provided on the second substrate 31 different from the first substrate 21 on which the first electrodes Tx are provided. Specifically, as illustrated in FIG. 6, the second electrodes Rx are provided at one side of the second substrate 31, which is opposite to the other side of the second substrate 31 to which the first electrodes Tx are provided. The second electrodes Rx are arranged between the second substrate 31 and the polarizing plate 35 in the direction perpendicular to the second substrate 31. This configuration allows the distance between the first electrodes Tx and the second electrodes Rx to be larger than that in the case where the first electrodes Tx and the second electrodes Rx are formed on an identical substrate. This configuration can prevent an increase in capacitance between the first electrodes Tx and the second electrodes Rx even when a multitude of second electrodes Rx are provided by reducing the arrangement interval Pry of the second electrodes Rx. The second electrodes Rx serving as the detection electrodes are positioned closer to a target object such as a finger than the position of the first electrodes Tx is to the target object. This configuration makes it possible for the display device 1 to improve detection performance.

The first electrode selection circuits 15 are provided to the first substrate 21, while the second electrode selection circuit 16 is provided to the second substrate 31. This configuration causes the number of coupling terminals between the flexible substrates 73 and the first substrate 21 to be smaller than the number of first electrodes Tx. This configuration also causes the number of coupling terminals between the flexible substrate 71 and the second substrate 31 to be smaller than the number of second electrodes Rx. That is, the number of terminals used for coupling with the external drive IC and touch IC, for example, can be reduced.

Figure 7:
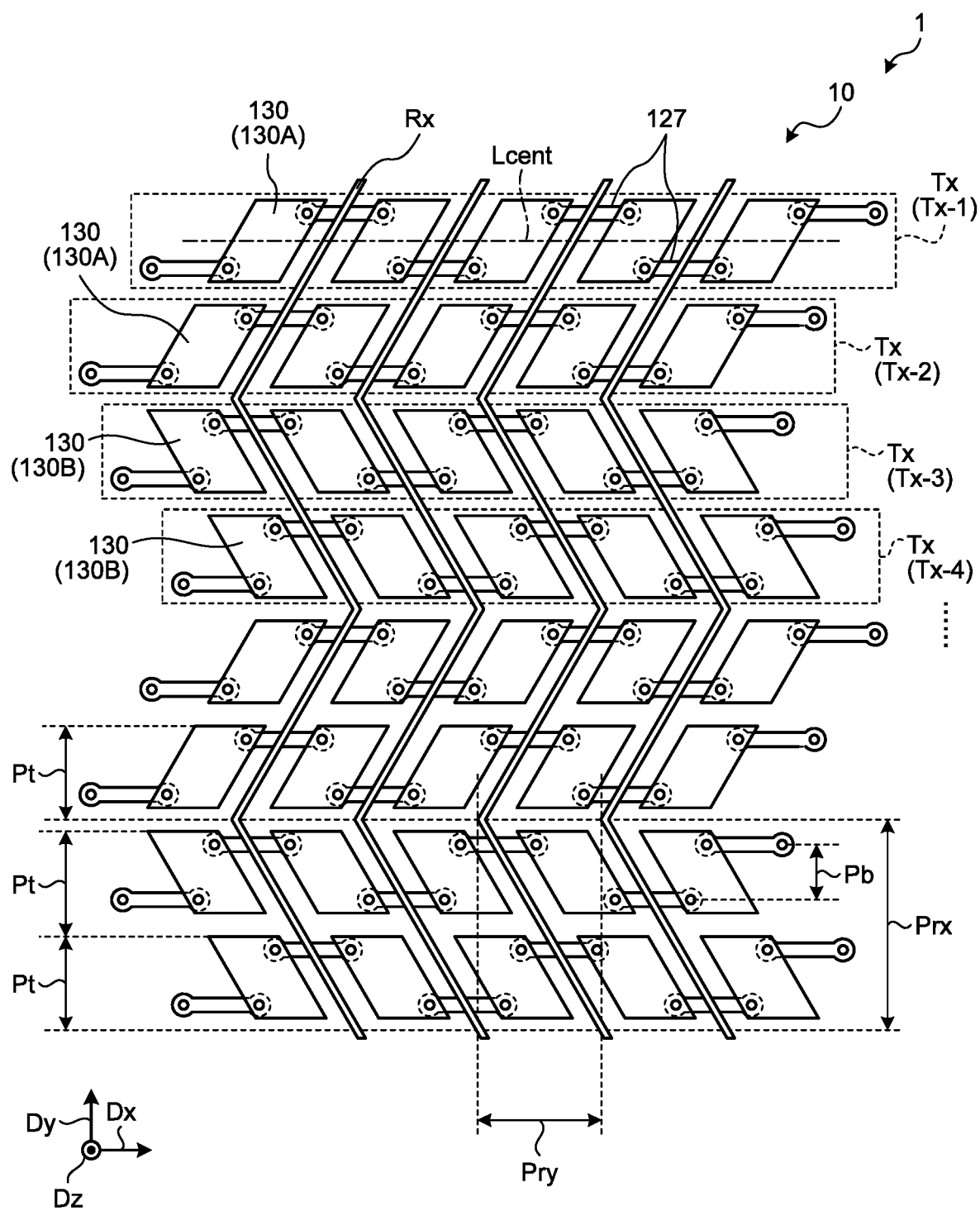
FIG. 7 is a plan view illustrating another exemplary configuration of first electrodes.

FIG. 7 is a plan view illustrating another exemplary configuration of the first electrodes. FIG. 7 schematically illustrates an arrangement relation between the first electrodes Tx and the second electrodes Rx that are provided to the different substrates. As illustrated in FIG. 7, each of the first electrodes Tx arrayed in the second direction Dy (e.g., first electrodes Tx-1, Tx-2, Tx-3, Tx-4, . . . ) has a plurality of electrode portions 130 and a plurality of coupling portions 127. In each first electrode Tx, the electrode portions 130 are arrayed in the first direction Dx and are apart from one another. In each first electrode Tx, the coupling portions 127 each couple the adjacent electrode portions 130. When viewed from the third direction Dz, the second electrodes Rx each run between the adjacent electrode portions 130 and intersect the coupling portions 127.

The electrode portions 130 include first electrode portions 130A and second electrode portions 130B having a shape different from that of the first electrode portion 130A. When viewed from the normal direction (the third direction Dz), the first electrode portions 130A and the second electrode portions 130B each have a parallelogram shape. The shape of the second electrode portion 130B is obtained by vertically flipping the shape of the first electrode portion 130A.

For example, the first electrodes Tx-1 and Tx-2, which intersect the second linear portions 26b (refer to FIG. 5) of the second electrodes Rx, each include the first electrode portions 130A each having two sides in parallel with the second linear portions 26b. The first electrodes Tx-3 and Tx-4, which intersect the first linear portions 26a (refer to FIG. 5) of the second electrodes Rx, each include the second electrode portions 130B each having two sides in parallel with the first linear portions 26a. When viewed from the normal direction (the third direction Dz), the first electrode portions 130A and the second electrode portions 130B are arranged along the second electrodes Rx having a zigzag shape. This arrangement can keep a separation distance between the second electrode Rx and the respective electrode portions a constant length.

The arrangement interval of the coupling portions 127 in the second direction Dy is defined as an arrangement interval Pb. The arrangement interval Pb of the coupling portions 127 is preferably 0.5 times the arrangement width Pt of the first electrodes Tx. A virtual line that is in parallel with the first direction Dx and that passes through the center of the electrode portion 130 is defined as a centerline Lcent. In each first electrode Tx, the coupling portions 127 are preferably alternately arranged on one side and the other side of the centerline Lcent. With this arrangement, the coupling portions 127 having a lower light transmittance than that of the electrode portion 130 are not arrayed in a straight line. As a result, the display device 1 can prevent occurrence of unintended patterns such as moire.

The longitudinal directions of the coupling portions 127 are preferably aligned in one direction. For example, the longitudinal directions of the coupling portions 127 in the first electrodes Tx are aligned in the first direction Dx. This alignment uniformizes the shapes of the coupling portions 127 intersecting the second electrodes Rx, thereby easily uniformizing capacitance between the first electrodes Tx and the coupling portions 127.

As illustrated in FIG. 7, the shapes of the first electrodes Tx, the shapes of the second electrodes Rx, and the positional relations between the first electrodes Tx and the second electrodes Rx are uniform among the electrodes. Accordingly, a variance in capacitance of the first electrodes Tx and a variance in capacitance of the second electrodes Rx are small. In addition, this configuration has an advantage of easiness in correcting coordinate calculation by the detector 40.

Figure 8:
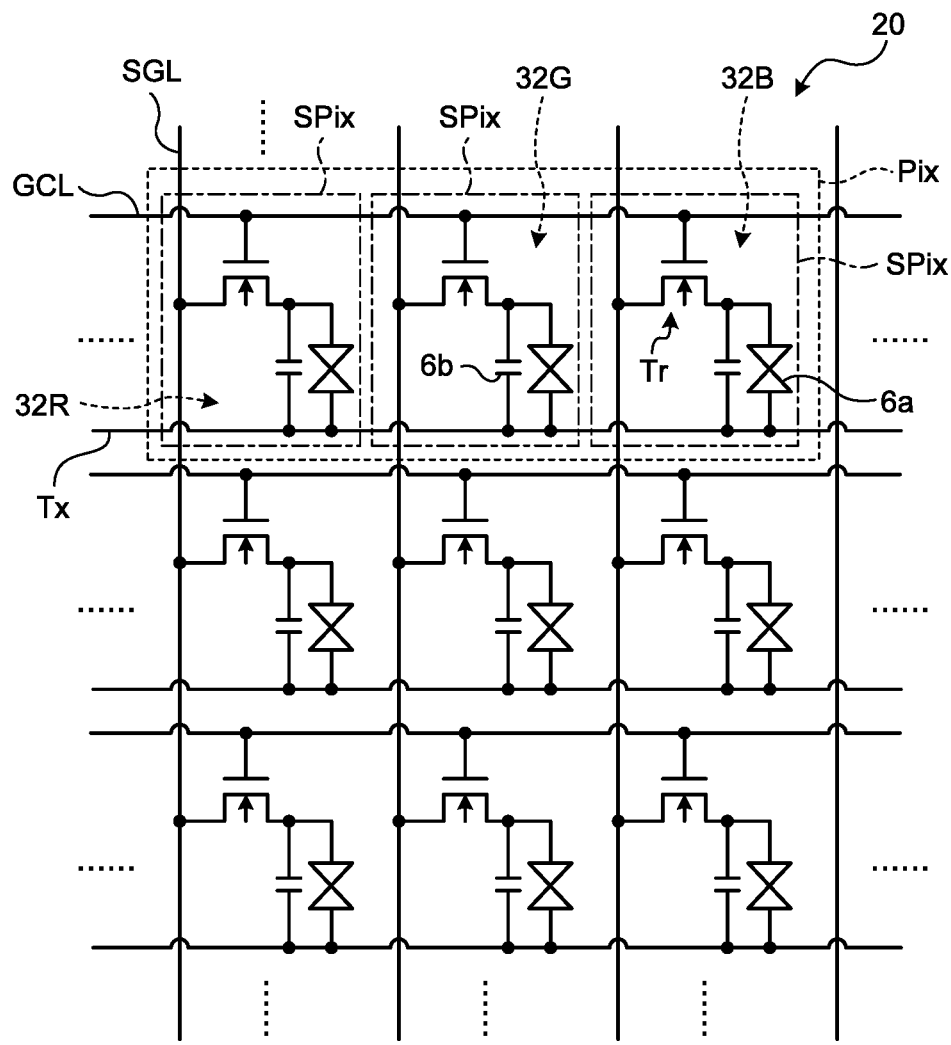
FIG. 8 is a circuit diagram illustrating arrangement of pixels of the display device according to the first embodiment.

The following describes display operation of the display device 1. FIG. 8 is a circuit diagram illustrating an arrangement of pixels of the display device according to the first embodiment. The first substrate 21 (refer to FIG. 6) is provided with thin film transistor elements (hereinafter described as TFT elements) Tr, and wires such as the signal lines SGL and the gate lines GCL. The TFT elements Tr, the signal lines SGL, and the gate lines GCL are illustrated in FIG. 8. The TFT element Tr is provided for each sub-pixel SPix. The signal lines SGL are wires that supply the pixel signals Vpix to the respective pixel electrodes 22. The gate lines GCL are wires that supply the signals for driving the respective TFT elements Tr.

The display panel 20 illustrated in FIG. 8 has the sub-pixels SPix arrayed in a matrix (row-column configuration).

The sub-pixels SPix each include the TFT element Tr and a liquid crystal element 6a. The TFT element Tr is a thin film transistor. In this example, the TFT element Tr is an n-channel metal oxide semiconductor (MOS) TFT. The insulation layer 24 is provided between the pixel electrodes 22 and the first electrodes Tx (common electrode). Accordingly, holding capacitance 6b illustrated in FIG. 8 is generated.

The gate driver 12 illustrated in FIG. 1 sequentially selects the gate line GCL. The gate driver 12 applies the scanning signals Vscan to the gates of the TFT elements Tr of the sub-pixels SPix via the selected gate line GCL. Accordingly, a row (one horizontal line) of the sub-pixels SPix is sequentially selected as a target of display drive. The source driver 13 supplies the pixel signals Vpix to the sub-pixels SPix constituting the selected horizontal line via the signal lines SGL. In the sub-pixels SPix, one horizontal line is displayed in accordance with the supplied pixel signals Vpix.

The drive electrode driver 14 supplies the display drive signals Vcomdc to the first electrodes Tx in performing display. The display drive signal Vcomdc is a direct current voltage signal having a certain potential. Accordingly, the first electrodes Tx function as common electrodes that apply a common potential to the pixels Pix. The extending direction of the first electrodes Tx in the present embodiment is in parallel with the extending direction of the gate lines GCL and intersects the extending direction of the signal lines SGL.

In the color filter 32 illustrated in FIG. 6, a color region 32R colored in red (R), a color region 32G colored in green (G), and a color region 32B colored in blue (B) are periodically arrayed, for example. Each of the color regions 32R, 32G, and 32B presenting respective colors of R, G, and B, which serve as a set, is associated with one of sub-pixels SPix illustrated in FIG. 8. The set of the color regions 32R, 32G, and 32B constitutes the pixel Pix. As illustrated in FIG. 6, the color filter 32 faces the liquid crystal layer 6 in the direction perpendicular to the first substrate 21. The color filter 32 may be composed of a combination of other colors as long as it is colored in different colors. The color filter 32 is not limited to be the combination of three colors, and may be composed of a combination of four or more colors.

Figure 9:
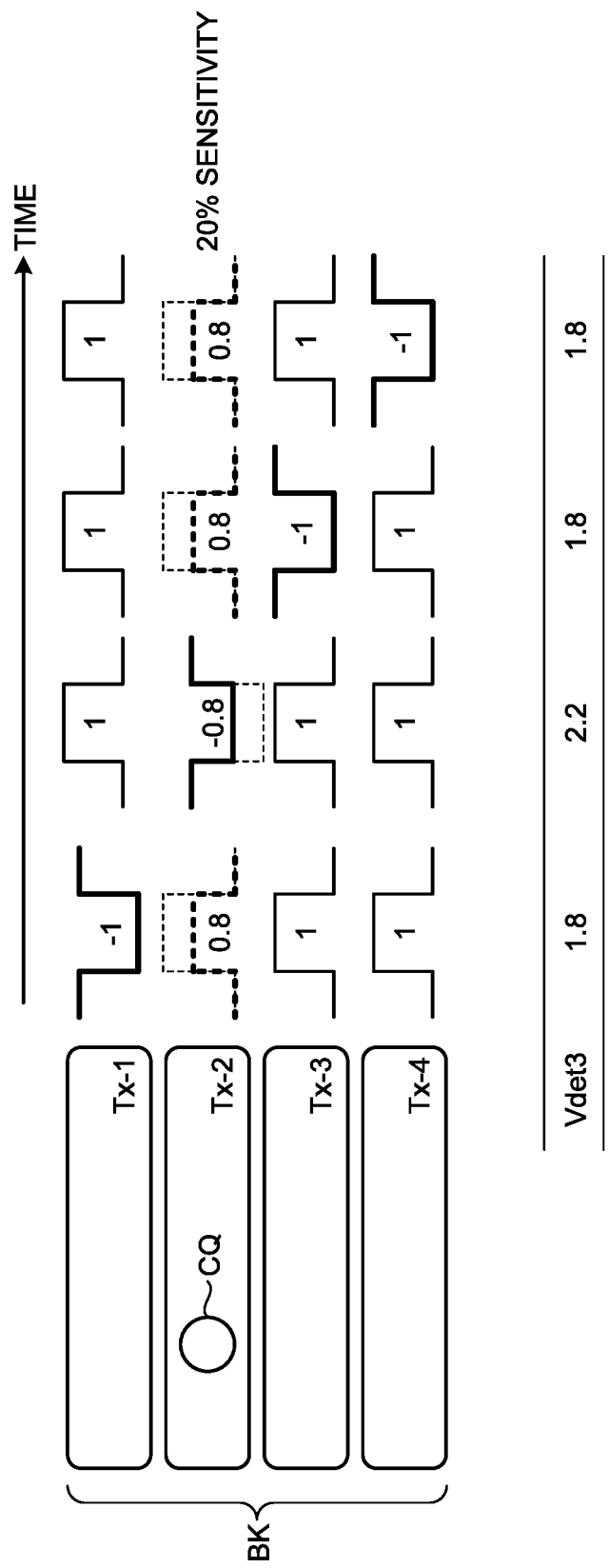
FIG. 9 is a diagram for explaining exemplary operation of code division multiplexing drive.

The following describes the CDM drive in the display device 1. FIG. 9 is a diagram for explaining exemplary operation of the CDM drive. FIG. 9 illustrates the exemplary operation of the CDM drive of four first electrodes Tx, i.e., the first electrodes Tx-1, Tx-2, Tx-3, and Tx-4 for easy explanation. As illustrated in FIG. 9, the first electrode selection circuit 15 (refer to FIG. 4) simultaneously selects the first electrodes Tx-1, Tx-2, Tx-3, and Tx-4 in the first electrode block BK. The first electrode selection circuit 15 supplies the drive signals Vcom having phases determined on the basis of the certain code to the respective selected first electrodes Tx.

For example, the certain code is defined by a square matrix in Expression (1) described below. The order of the square matrix is four, which is the number of first electrodes Tx-1, Tx-2, Tx-3, and Tx-4. The certain code is defined by the square matrix that is composed of elements of "1" and "−1" or elements of "1" and "0" and in which any different two rows are orthogonal matrix. The certain code is defined by the Hadamard matrix, for example. A diagonal component "−1" of the square matrix in Expression (1) described below is different from a component "1" other than the diagonal component of the square matrix. The first electrode selection circuit 15 applies the drive signals Vcom on the basis of the square matrix in Expression (1) described below such that the phase of the alternating current rectangular wave corresponding to the component "1" other than the diagonal component of the square matrix and the phase of the alternating current rectangular wave corresponding to the diagonal component "−1" of the square matrix are inverted. The component "−1" is a component for supplying the drive signal Vcom determined to have a phase different from that of the component "1".

$$\begin{pmatrix} -1 & 1 & 1 & 1 \\ 1 & -1 & 1 & 1 \\ 1 & 1 & -1 & 1 \\ 1 & 1 & 1 & -1 \end{pmatrix} \begin{pmatrix} 1.8 \\ 2.2 \\ 1.8 \\ 1.8 \end{pmatrix} = \begin{pmatrix} 4.0 \\ 3.2 \\ 4.0 \\ 4.0 \end{pmatrix} \quad (1)$$

When an external proximity object CQ such as a finger is present at the first electrode Tx-2 among the first electrodes Tx-1, Tx-2, Tx-3, and Tx-4, the external proximity object CQ generates a difference voltage by mutual induction (e.g., the difference voltage is 20%). In the example illustrated in FIG. 9, the third detection signal Vdet3, which is a signal synthesizing a first detection signal Vdet1 corresponding to the component "1" and a second detection signal Vdet2 corresponding to the component "−1", is output from the second electrode Rx. The third detection signal Vdet3 detected by the detector 40 in a first time period is expressed by: (−1)+(0.8)+(1)+(1)=1.8. The third detection signal Vdet3 detected by the detector 40 in a second time period is expressed by: (1)+(−0.8)+(1)+(1)=2.2. The third detection signal Vdet3 detected by the detector 40 in a third time period is expressed by: (1)+(0.8)+(−1)+(1)=1.8. The third detection signal Vdet3 detected by the detector 40 in a fourth time period is expressed by: (1)+(0.8)+(1)+(−1)=1.8.

The signal processor 44 performs decoding processing by multiplying the third detection signals Vdet3 by the square matrix in Expression (1). The signal processor 44 thus computes decoded signals Vdet4 as 4.0, 3.2, 4.0, and 4.0. In accordance with the decoded signals Vdet4, the detector 40 can detect presence or absence of the external proximity object CQ such as a finger at the position of the first electrode Tx-2 or ridges and valleys of a surface of the external proximity object CQ. In this way, the display device 1 can perform detection with detection sensitivity four times higher than that of the time division multiplexing (TDM) drive without increasing a voltage. The coordinate extractor 45 outputs the touch panel coordinates or the decoded signals Vdet4 as the sensor output Vo.

Figure 10:
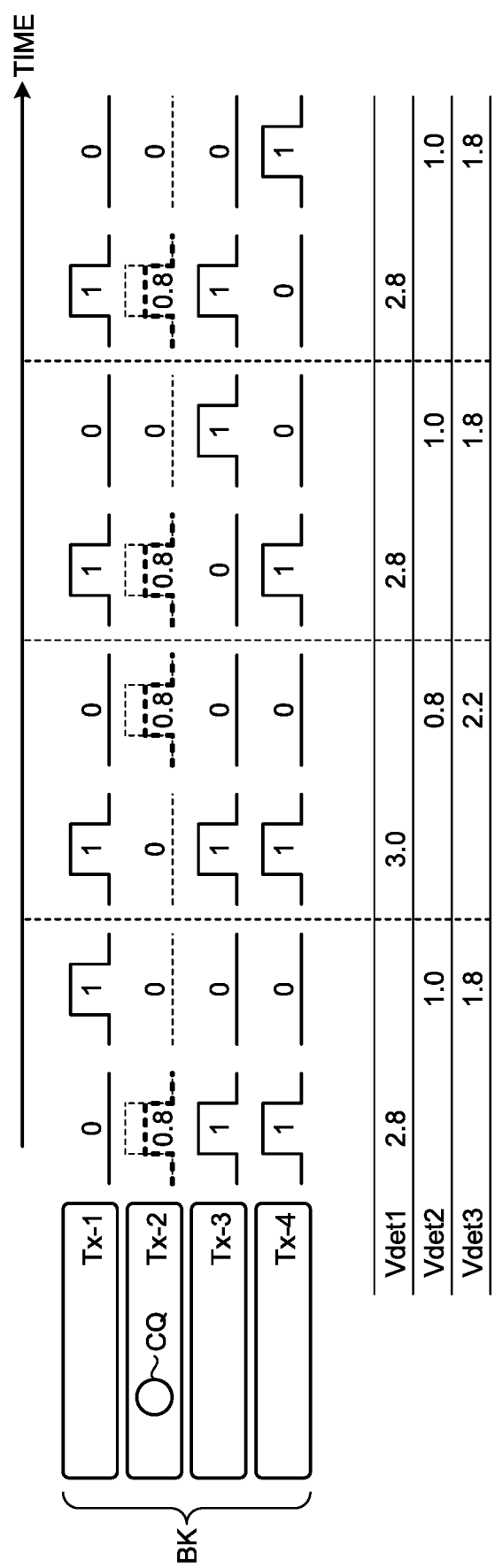
FIG. 10 is a diagram for explaining another exemplary operation of the code division multiplexing drive.

FIG. 10 is a diagram for explaining another exemplary operation of the CDM drive. In FIG. 10, the drive signal Vcom is applied to the first electrodes Tx corresponding to the component "1" on the basis of the components of the square matrix and the first electrodes Tx corresponding to the component "−1" on the basis of the components of the square matrix in different time periods. In this case, the phase of the alternating current rectangular wave corresponding to the component "1" of the square matrix and the phase of the alternating current rectangular wave corresponding to the component "−1" of the square matrix are identical. Specifically, the first electrode selection circuit 15 supplies the drive signal Vcom to the first electrode Tx corresponding to the component "1" in first, third, fifth, and seventh time periods. The first electrode selection circuit 15 does not supply the drive signal Vcom to the first electrode Tx corresponding to the component "−1". In second, fourth, sixth, and eighth time periods, the first electrode selection circuit 15 does not supply the drive signal Vcom to the first electrode Tx corresponding to the component "1", while the first electrode selection circuit 15 supplies the drive signal Vcom to the first electrode Tx corresponding to the component "−1".

The signal processor 44 computes the third detection signal Vdet3 (=1.8) from the difference between the first detection signal Vdet1 (=2.8) detected in the first time period and the second detection signal Vdet2 (=1.0) detected in the second time period. The signal processor 44 computes the third detection signal Vdet3 (=2.2) from the difference between the first detection signal Vdet1 (=3.0) detected in the third time period and the second detection signal Vdet2 (=0.8) detected in the fourth time period. The signal processor 44 computes the third detection signal Vdet3 in the same manner as described above for the fifth time period and later. The signal processor 44 computes the decoded signals Vdet4 as 4.0, 3.2, 4.0, 4.0 by decoding the respective computed third detection signals Vdet3.

FIGS. 9 and 10 illustrate the exemplary operation of the CDM drive of four first electrodes Tx. The CDM drive may be performed on five or more first electrodes Tx. In this case, the order of the certain code is equal to or larger than the number of first electrodes Tx.

Figure 11:
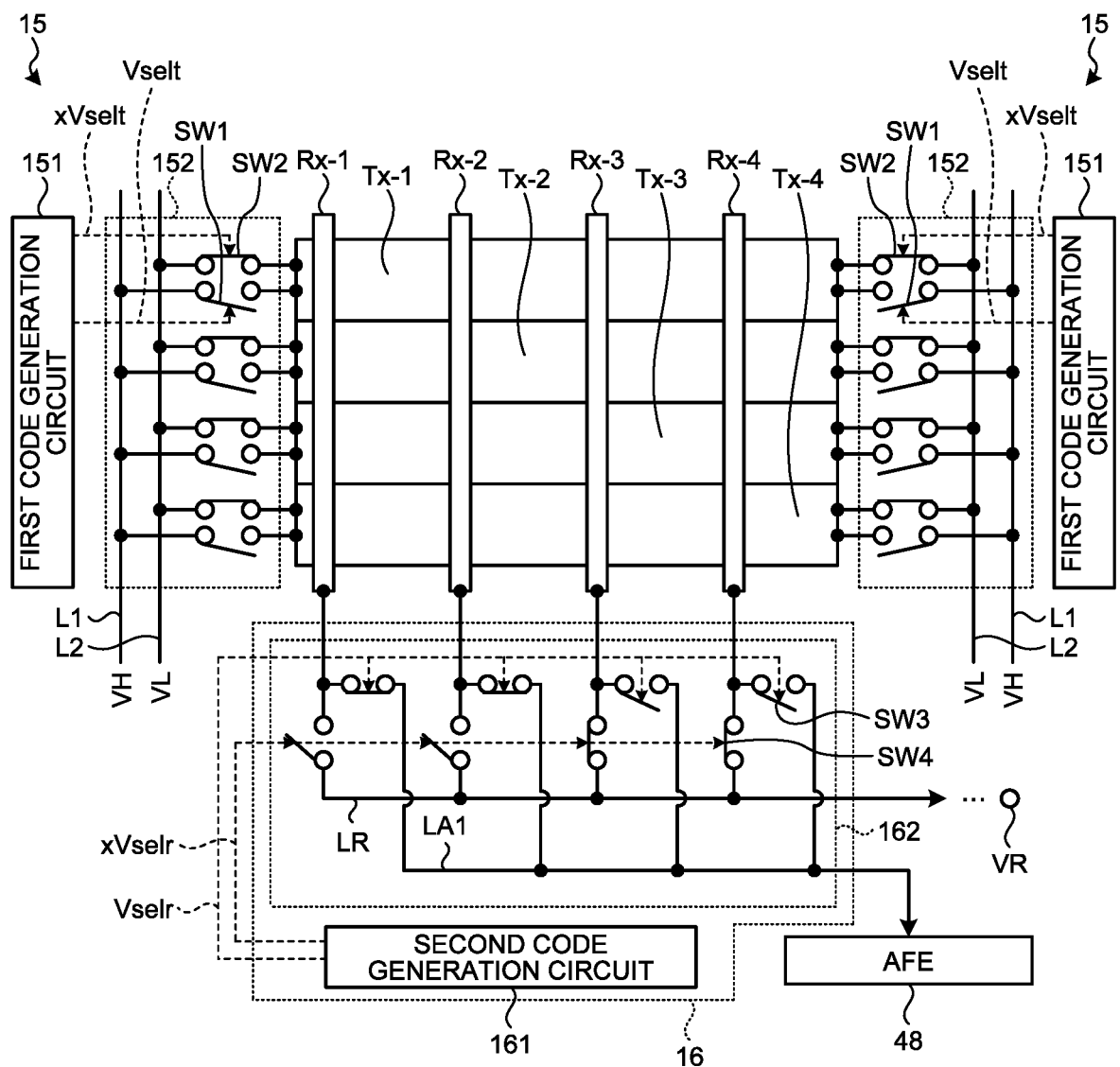
FIG. 11 is a circuit diagram schematically illustrating first electrode selection circuits and a second electrode selection circuit.

The following describes the first electrode selection circuit 15 and the second electrode selection circuit 16. FIG. 11 is a circuit diagram schematically illustrating the first electrode selection circuits and the second electrode selection circuit. FIG. 12 is a table illustrating, on a period-to-period basis, a relation between the first electrodes and drive signals and a coupling relation between second electrodes and an analog front end (AFE). In FIG. 11, the first electrodes Tx and the second electrodes Rx, which are provided on different substrates, are schematically illustrated by being overlapped.

As illustrated in FIG. 11, the first electrode selection circuit 15 includes a first code generation circuit 151 and a drive signal supplying circuit 152. The first code generation circuit 151 produces the certain code expressed by Expression (2) described below in accordance with the control signals from the controller 11 (refer to FIG. 1), for example. The first code generation circuit 151 supplies a first selection signal Vselt and a second selection signal xVselt to the drive signal supplying circuit 152. The first selection signal Vselt and the second selection signal xVselt are voltage signals having phases determined for the respective first electrodes Tx on the basis of the certain code. The first selection signal Vselt is a signal corresponding to the component "1", for example. The second selection signal xVselt is a signal corresponding to the component "−1". The first selection signal Vselt and the second selection signal xVselt are alternating current voltage signals having phases inverted from each other. FIGS. 11 and 12 each illustrate an example in which the certain code is the square matrix expressed by Expression (2), but the certain code is not limited thereto. In FIGS. 11 and 12, the certain code may be also defined by the Hadamard matrix.

$$\begin{pmatrix} 1 & 1 & 1 & 1 \\ 1 & -1 & 1 & -1 \\ 1 & 1 & -1 & -1 \\ 1 & -1 & -1 & 1 \end{pmatrix} \quad (2)$$

The drive signal supplying circuit 152 includes a first drive signal supplying line L1, a second drive signal supplying line L2, first switches SW1, and second switches SW2. The first drive signal supplying line L1 and the second drive signal supplying line L2 are provided adjacent to the edges of the first electrodes Tx, and extend along the array direction of the first electrodes Tx. The first drive signal supplying line L1 supplies a first voltage signal VH to the first electrodes Tx. The second drive signal supplying line L2 supplies a second voltage signal VL to the first electrodes Tx. The second voltage signal VL is a direct current voltage signal having a smaller potential than that of the first voltage signal VH.

The first switch SW1 and the second switch SW2 are provided for each first electrode Tx. The first switch SW1 switches coupling and decoupling between the first electrode Tx and the first drive signal supplying line L1. The second switch SW2 switches coupling and decoupling between the first electrode Tx and the second drive signal supplying line L2. The first switch SW1 and the second switch SW2 are TFT elements, for example.

The first switch SW1 is turned on or off in accordance with the first selection signal Vselt. The second switch SW2 is turned on or off in accordance with the second selection signal xVselt. The on-and-off operation of the first switch SW1 is reverse from that of the second switch SW2. The first switch SW1 and the second switch SW2 repeat on and off alternately, the first voltage signal VH having a high level voltage and the second voltage signal VL having a low level voltage are alternately supplied to the first electrode Tx. Accordingly, the drive signal Vcom, which is an alternating current voltage signal, is supplied to the first electrode Tx. The first code generation circuit 151 determines the phases of the first selection signal Vselt and the second selection signal xVselt for each first electrode Tx on the basis of the certain code. As a result, the drive signal supplying circuit 152 supplies a drive signal Vcom-H and a drive signal Vcom-L (refer to FIG. 12) to each first electrode Tx. The drive signal Vcom-H is an alternating current voltage signal corresponding to the component "1" of the square matrix expressed by Expression (2). The drive signal Vcom-L is an alternating current voltage signal corresponding to the component "−1" of the square matrix expressed by Expression (2).

As illustrated in FIG. 11, the second electrode selection circuit 16 includes a second code generation circuit 161 and a coupling switching circuit 162. The second code generation circuit 161 generates the certain code expressed by Expression (2) in accordance with, for example, the control signals from the controller 11 (refer to FIG. 1). The second code generation circuit 161 supplies a third selection signal Vselr and a fourth selection signal xVselr to the coupling switching circuit 162. The third selection signal Vselr and the fourth selection signal xVselr are voltage signals having phases determined for the respective second electrodes Rx on the basis of the certain code. The third selection signal Vselr is a signal corresponding to the component "1", for example. The fourth selection signal xVselr is a signal corresponding to the component "−1".

The coupling switching circuit 162 includes the first output signal line LA1, a reference potential supplying line LR, third switches SW3, and fourth switches SW4. The first output signal line LA1 and the reference potential supplying line LR are provided adjacent to the edges of the second electrodes Rx, and extend along the array direction of the second electrodes Rx. The first output signal line LA1 is coupled to an analog front end (AFE) circuit 48. The AFE 48 is a signal processing circuit that has functions of at least the detection signal amplifier 42 and the A/D converter 43 (refer to FIG. 1). The detection signals Vdet from the selected second electrodes Rx are output to the AFE 48 through the first output signal line LA1. The reference potential supplying line LR is coupled to a reference potential VR. The reference potential VR is supplied to the non-selected second electrodes Rx through the reference potential supplying line LR. The reference potential VR is a direct current voltage signal having a potential identical to that of the voltage signals supplied to the second electrodes Rx in detection.

The third switch SW3 and the fourth switch SW4 are provided for each second electrode Rx. The third switch SW3 switches coupling and decoupling between the second electrode Rx and the first output signal line LA1. The fourth switch SW4 switches coupling and decoupling between the second electrode Rx and the reference potential supplying line LR. The third switch SW3 and the fourth switch SW4 are TFT elements, for example.

The third switch SW3 is turned on or off in accordance with the third selection signal Vselr. The fourth switch SW4 is turned on or off in accordance with the fourth selection signal xVselr. The on-and-off operation of the third switch SW3 is reverse from that of the fourth switch SW4. The third switch SW3 is turned on by the third selection signal Vselr corresponding to the component "1". Accordingly, the selected second electrodes Rx are coupled to the AFE 48. The signal obtained by synthesizing the detection signals Vdet of the second electrodes Rx is output to the AFE 48. Meanwhile, the fourth switch SW4 is turned on by the fourth selection signal xVselr corresponding to the component "−1". Accordingly, the reference potential VR is supplied to the non-selected second electrodes Rx. This can prevent capacitance coupling between the selected second electrodes Rx and the non-selected second electrodes Rx. As a result, a detection error and deterioration of detection sensitivity can be prevented.

In FIG. 12, the drive signal Vcom-H and drive signal Vcom-L, which are supplied to the first electrodes Tx, are illustrated for each of a first period ta1, a second period ta2, a third period ta3, and a fourth period ta4. In FIG. 12, the AFE 48 to which the second electrodes Rx are coupled and the reference potential VR are illustrated for each of a first partial period tb1, a second partial period tb2, a third partial period tb3, a fourth partial period tb4, a fifth partial period tb5, a sixth partial period tb6, and a seventh partial period tb7.

The first electrode selection circuit 15 supplies the drive signals Vcom having phases determined on the basis of the certain code expressed by Expression (2) to the respective first electrodes Tx, as illustrated in FIG. 12. Specifically, in the first period ta1, the first electrode selection circuit 15 supplies the drive signals Vcom-H to all of the first electrodes Tx-1, Tx-2, Tx-3, and Tx-4 corresponding to the component "1" on the basis of the components in the first row of the square matrix in Expression (2). In the second period ta2, the first electrode selection circuit 15 supplies the drive signals Vcom-H to the first electrodes Tx-1 and Tx-3 corresponding to the component "1" on the basis of the components in the second row of the square matrix in Expression (2). In the second period ta2, the first electrode selection circuit 15 supplies the drive signals Vcom-L to the first electrodes Tx-2 and Tx-4 corresponding to the component "−1" on the basis of the components in the second row of the square matrix in Expression (2). In the third period ta3 and the fourth period ta4, the first electrode selection circuit 15 supplies the drive signals Vcom-H or Vcom-L on the basis of the respective components in the corresponding row of the square matrix in Expression (2) to the first electrode Tx in the same manner as described above.

As illustrated in FIG. 12, the second electrode selection circuit 16 selects the second electrodes Rx on the basis of the certain code expressed by Expression (2), and couples the selected second electrodes Rx to the first output signal line LA1. Specifically, in the partial period tb1, the second electrode selection circuit 16 selects all of the second electrodes Rx-1, Rx-2, Rx-3, and Rx-4 corresponding to the component "1" on the basis of the components in the first row of the square matrix expressed by Expression (2). The second electrodes Rx-1, Rx-2, Rx-3, and Rx-4 are coupled to the AFE 48 via the first output signal line LA1. Accordingly, the first detection signals Vdet1 (refer to FIG. 10) are output from the second electrodes Rx-1, Rx-2, Rx-3, and Rx-4 to the AFE 48. Because the component "−1" is absent in the first row of the square matrix expressed by Expression (2), the period for detecting the second detection signal Vdet2 (refer to FIG. 10) is omitted. The signal processor 44 acquires the first detection signals Vdet1 (refer to FIG. 10) in the first partial period tb1 as the third detection signal Vdet3 (refer to FIG. 10).

In the second partial period tb2, the second electrode selection circuit 16 selects the second electrodes Rx-1 and Rx-3 corresponding to the component "1" on the basis of the components in the second row of the square matrix expressed by Expression (2). The second electrodes Rx-1 and Rx-3 are coupled to the AFE 48 via the first output signal line LA1. Accordingly, the first detection signals Vdet1 are output from the second electrodes Rx-1 and Rx-3 to the AFE 48. The reference potential VR is supplied to the non-selected second electrodes Rx-2 and Rx-4 via the reference potential supplying line LR.

In the third partial period tb3, the second electrode selection circuit 16 selects the second electrodes Rx-2 and Rx-4 corresponding to the component "−1" on the basis of the components in the second row of the square matrix expressed by Expression (2). The second electrodes Rx-2 and Rx-4 are coupled to the AFE 48 via the first output signal line LA1. Accordingly, the second detection signals Vdet2 (refer to FIG. 10) are output from the second electrodes Rx-2 and Rx-4 to the AFE 48. Meanwhile, the reference potential VR is supplied to the non-selected second electrodes Rx-1 and Rx-3 via the reference potential supplying line LR. The signal processor 44 computes the third detection signal Vdet3 from the difference between the first detection signals Vdet1 in the second partial period tb2 and the second detection signals Vdet2 in the third partial period tb3.

In the same manner as described above, the second electrode selection circuit 16 selects the second electrodes Rx on the basis of the certain code expressed by Expression (2) from the fourth partial period tb4 to the seventh partial period tb7. Accordingly, the signal processor 44 acquires four third detection signals Vdet3 from the first partial period tb1 to the seventh partial period tb7. The signal processor 44 computes the decoded signals Vdet4 for the respective second electrodes Rx by decoding the respective third detection signals Vdet3. The second electrode selection circuit 16 thus can perform the CDM drive on the second electrodes Rx.

As illustrated in FIG. 5, the second electrodes Rx and the second electrode selection circuit 16 are provided on the second substrate 31. A plurality of second electrodes Rx is coupled to a single AFE 48 via the first output signal line LA1. With this configuration, the number of AFEs 48 can be reduced even when the number of second electrodes Rx is increased. In addition, the number of wires coupling the second substrate 31 and the AFE 48 can be reduced.

As illustrated in FIG. 12, the partial periods from first partial period tb1 to the seventh partial period tb7 are provided for each of the first period ta1, the second period ta2, the third period ta3, and the fourth period ta4. The order of the respective periods may be changed as appropriate. While the CDM drive has been described with reference to FIGS. 11 and 12, the display device 1 may perform detection by the TDM drive. In the TDM drive, the first electrode selection circuit 15 supplies the drive signals Vcom having an identical phase to the first electrodes Tx in the first electrode block BK.

Figure 13:
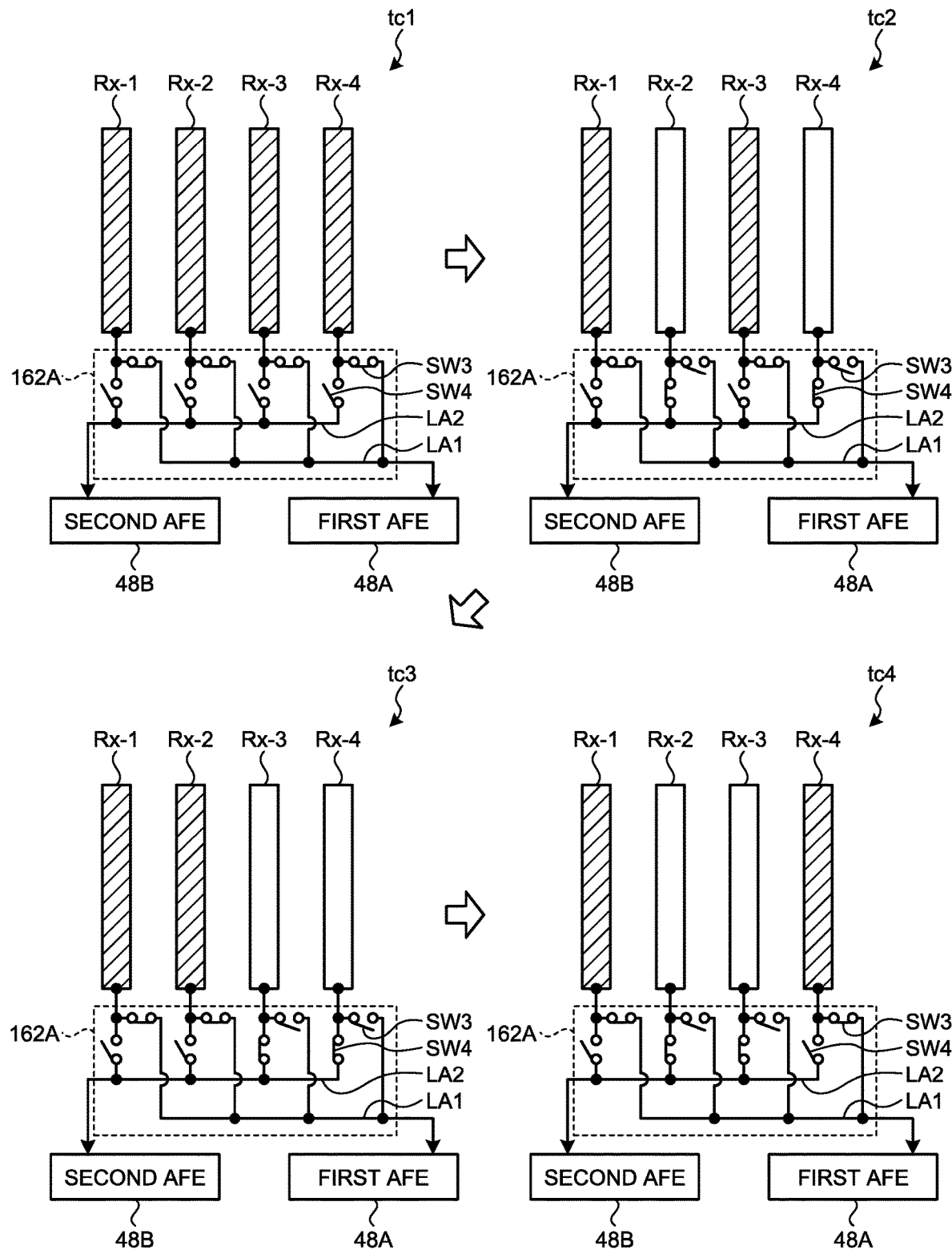
FIG. 13 is a diagram for explaining another example of the second electrode selection circuit.

FIG. 13 is a diagram for explaining another example of the second electrode selection circuit. In FIG. 13, the first electrodes Tx, the first electrode selection circuits 15, and the second code generation circuit 161 are omitted. In FIG. 13, the selected second electrodes Rx corresponding to the component "1" are hatched.

As illustrated in FIG. 13, a coupling switching circuit 162A includes the first output signal line LA1, a second output signal line LA2, the third switches SW3, and the fourth switches SW4. The first signal line LA1 is coupled to a first AFE 48A. The second signal line LA2 is coupled to a second AFE 48B. The selected second electrodes Rx corresponding to the component "1" in the second row of the square matrix expressed by Expression (2) are coupled to the first AFE 48A. Meanwhile, the selected second electrodes Rx corresponding to the component "−1" in the second row of the square matrix expressed by Expression (2) are coupled to the second AFE 48B. That is, the non-selected second electrodes Rx not coupled to the first AFE 48A among the second electrodes Rx are coupled to the second AFE 48B. Accordingly, the first detection signals Vdet1 (refer to FIG. 10) are output to the first AFE 48A. In the same period, the second detection signals Vdet2 (refer to FIG. 10) are output to the second AFE 48B.

Specifically, in a first partial period tc1, the second electrode selection circuit 16 selects the second electrodes Rx-1, Rx-2, Rx-3, and Rx-4 corresponding to the component "1" on the basis of the components in the first row of the square matrix expressed by Expression (2). The operation of the third switches SW3 and the fourth switches SW4 causes the second electrodes Rx-1, Rx-2, Rx-3, and Rx-4 to be coupled to the first AFE 48A via the first output signal line LA1. Accordingly, the first detection signals Vdet1 (refer to FIG. 10) are output to the first AFE 48A from the second electrodes Rx-1, Rx-2, Rx-3, and Rx-4. In the first partial period tc1, because the component "−1" is absent in the first row of the square matrix expressed by Expression (2), none of the second electrodes Rx is coupled to the second AFE 48B.

In a second partial period tc2, the second electrode selection circuit 16 selects the second electrodes Rx-1 and Rx-3 corresponding to the component "1" on the basis of the components in the second row of the square matrix expressed by Expression (2). The operation of the third switches SW3 and the fourth switches SW4 causes the second electrodes Rx-1 and Rx-3 to be coupled to the first AFE 48A via the first output signal line LA1. Simultaneously, the second electrode selection circuit 16 selects the second electrodes Rx-2 and Rx-4 corresponding to the component "−1" on the basis of the components in the second row of the square matrix expressed by Expression (2). The operation of the third switches SW3 and the fourth switches SW4 causes the second electrodes Rx-2 and Rx-4 to be coupled to the second AFE 48B via the second output signal line LA2.

Accordingly, the first detection signals Vdet1 (refer to FIG. 10) are output to the first AFE 48A from the second electrodes Rx-1 and Rx-3. The second detection signals Vdet2 are output to the second AFE 48B from the second electrodes Rx-2 and Rx-4. The signal processor 44 computes the third detection signal Vdet3 from the difference between the first detection signals Vdet1 and the second detection signals Vdet2.

In a third partial period tc3, the second electrode selection circuit 16 selects the second electrodes Rx on the basis of the respective components in the third row of the square matrix expressed by Expression (2). In a fourth partial period tc4, the second electrode selection circuit 16 selects the second electrodes Rx on the basis of the respective components in the fourth row of the square matrix expressed by Expression (2). The signal processor 44 computes the decoded signals for the respective second electrodes Rx by decoding the respective third detection signals Vdet3 obtained in the respective partial periods.

In FIG. 13, the second electrode selection circuit 16 is coupled to the first AFE 48A and the second AFE 48B. The configuration can reduce the number of partial periods, which are from the first partial period tc1 to the fourth partial period tc4. As a result, a time period taken for detection is reduced. The partial periods from the first partial period tc1 to the fourth partial period tc4 are provided for each of the first period ta1, the second period ta2, the third period ta3, and the fourth period ta4, which are illustrated in FIG. 12.

First Modification of First Embodiment

Figure 14:
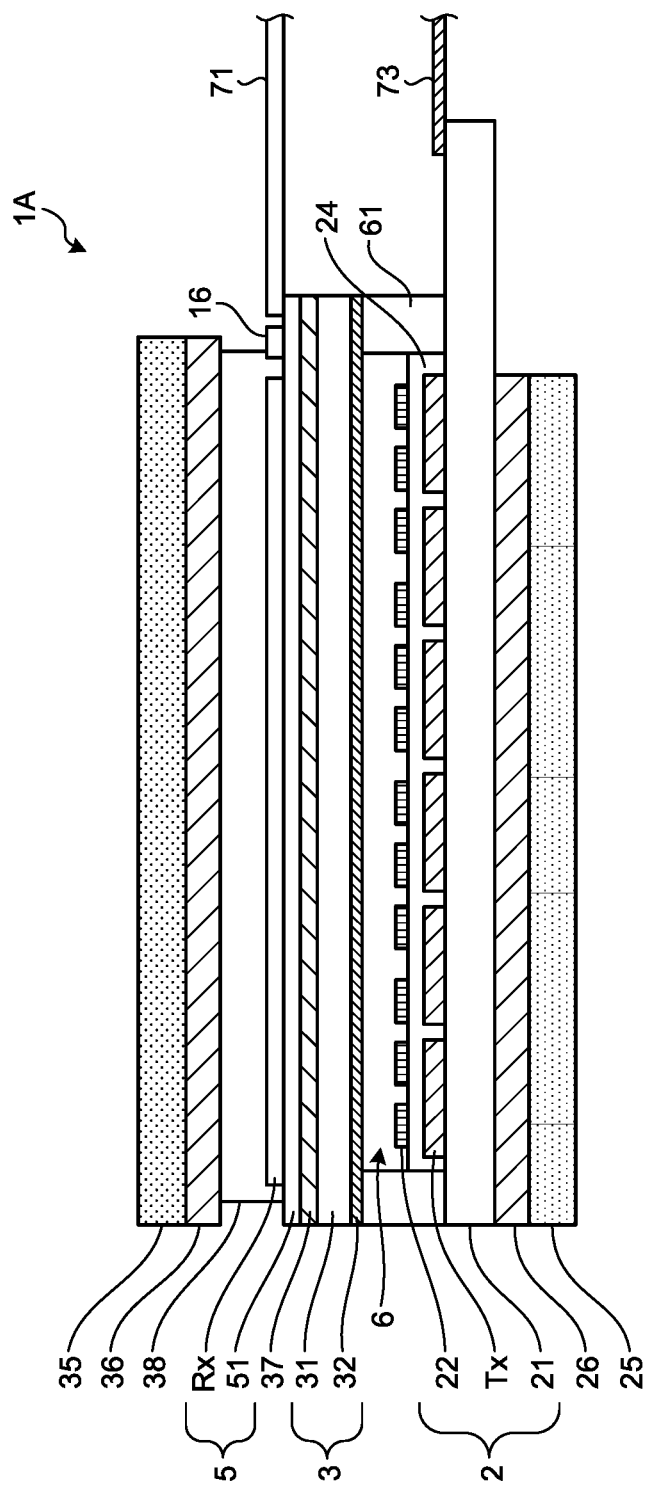
FIG. 14 is a cross-sectional view illustrating a schematic cross-sectional configuration of a display device according to a first modification of the first embodiment.

FIG. 14 is a cross-sectional view illustrating a schematic cross-sectional configuration of a display device according to a first modification of the first embodiment. In a display device 1A in the first modification, a sensor unit 5 is provided between the counter substrate 3 and the polarizing plate 35. The sensor unit 5 includes a sensor base 51, the second electrodes Rx, and the second electrode selection circuit 16.

The sensor base 51 is a resin substrate or a resin film that has a light transmitting property. The sensor base 51 may be a glass substrate. The sensor base 51 and the second substrate 31 are bonded together with an adhesive layer 37 interposed therebetween such that the sensor base 51 is above the second substrate 31. The second electrodes Rx and the second electrode selection circuit 16 are provided on one surface of the sensor base 51. The other surface of the sensor base 51 is bonded to the second substrate 31. The second electrodes Rx and the second electrode selection circuit 16 have the configuration identical to those illustrated, for example, in FIGS. 5 and 11. The polarizing plate 35 is bonded to the second electrodes Rx with the protection layer 38 and the adhesive layer 36 interposed therebetween such that the polarizing plate 35 is above the second electrodes Rx.

In other words, in the display device 1A in the modification, the first substrate 21, the first electrodes Tx, the second substrate 31, the sensor base 51, the second electrodes Rx, and the polarizing plate 35 are provided in this order in the direction perpendicular to the second substrate 31.

In the modification, the second electrodes Rx are not provided directly on the second substrate 31. This configuration can reduce the thickness of the second substrate 31. The second electrodes Rx are provided on the sensor base 51, which is different from the first substrate 21 on which the first electrodes Tx are provided. The distance between the first electrodes Tx and the second electrodes Rx is larger than that in a case where the first electrodes Tx and the second electrodes Rx are provided on an identical substrate. This configuration can prevent an increase in capacitance between the first electrode Tx and the second electrode Rx even when a multitude of second electrodes Rx are provided. The second electrodes Rx serving as the detection electrodes are positioned closer to a target object such as a finger than the position of the first electrodes Tx is to the target object. Specifically, the second electrodes Rx are provided at one side of each of the second substrate 31 and the sensor base 51, which is opposite to the other side of each of the second substrate 31 and the sensor base 51 to which the first electrodes Tx are provided. This configuration makes it possible for the display device 1 to improve detection performance.

Second Modification of First Embodiment

Figure 15:
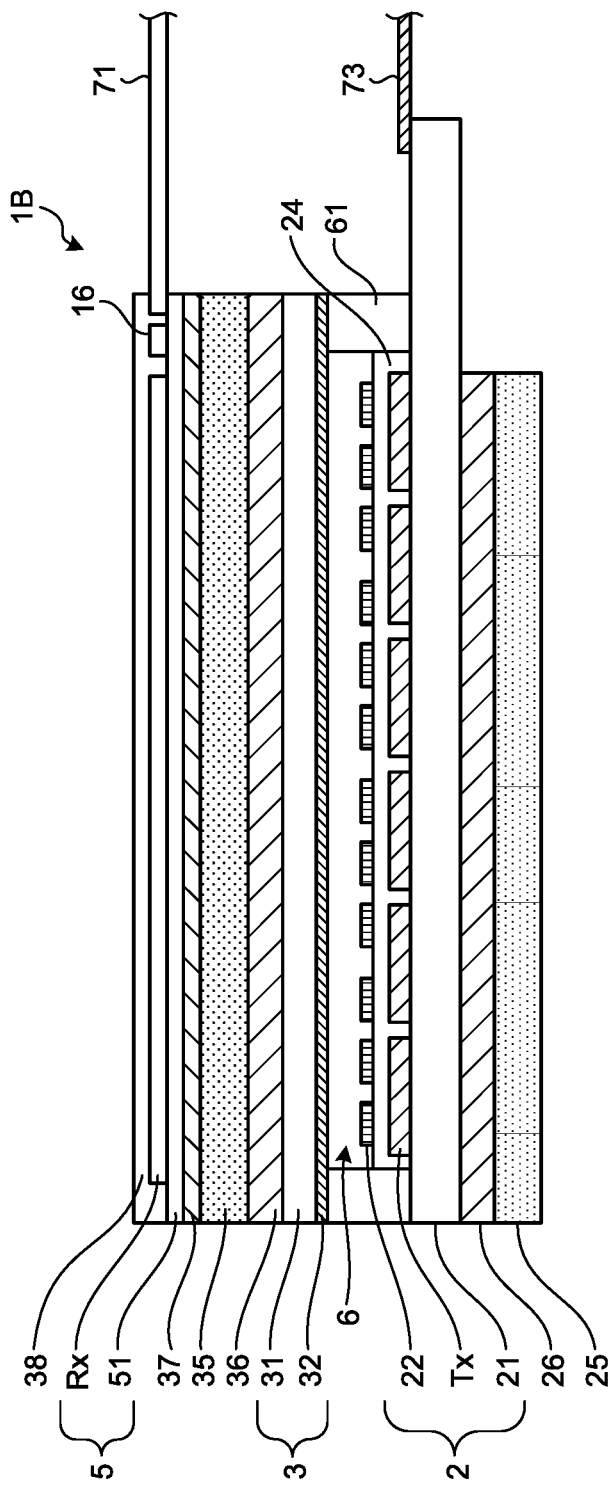
FIG. 15 is a cross-sectional view illustrating a schematic cross-sectional configuration of a display device according to a second modification of the first embodiment.

FIG. 15 is a cross-sectional view illustrating a schematic cross-sectional configuration of a display device according to a second modification of the first embodiment. In a display device 1B in the second modification, the sensor unit 5 is provided above the polarizing plate 35. The polarizing plate 35 and the second substrate 31 are bonded together with the adhesive layer 36 interposed therebetween such that the polarizing plate 35 is above the second substrate 31. The second electrodes Rx and the second electrode selection circuit 16 are provided on one surface of the sensor base 51. The other surface of the sensor base 51 and the polarizing plate 35 are bonded together with the adhesive layer 37 interposed therebetween such that the sensor base 51 is above the polarizing plate 35. The protection layer 38 is provided on the second electrodes Rx and the second electrode selection circuit 16.

In other words, the first substrate 21, the first electrodes Tx, the second substrate 31, the polarizing plate 35, the sensor base 51, and the second electrodes Rx are provided in this order in the direction perpendicular to the second substrate 31.

In the present modification, the second substrate 31 and the polarizing plate 35 are provided between the second electrodes Rx and the first electrodes Tx. The distance between the first electrodes Tx and the second electrodes Rx in the direction perpendicular to the second substrate 31 is larger than those in the display devices 1 and 1A. This configuration can prevent an increase in capacitance between the first electrodes Tx and the second electrodes Rx even when a multitude of second electrodes Rx are provided. Further, the second electrodes Rx serving as the detection electrodes are positioned close to the target object such as a finger in comparison with the cases of the display devices 1 and 1A. Specifically, the polarizing plate 35 is not arranged between the second electrodes Rx and the target object such as a finger. This configuration makes it possible for the display device 1B to improve detection performance.

Third Modification of First Embodiment

Figure 16:
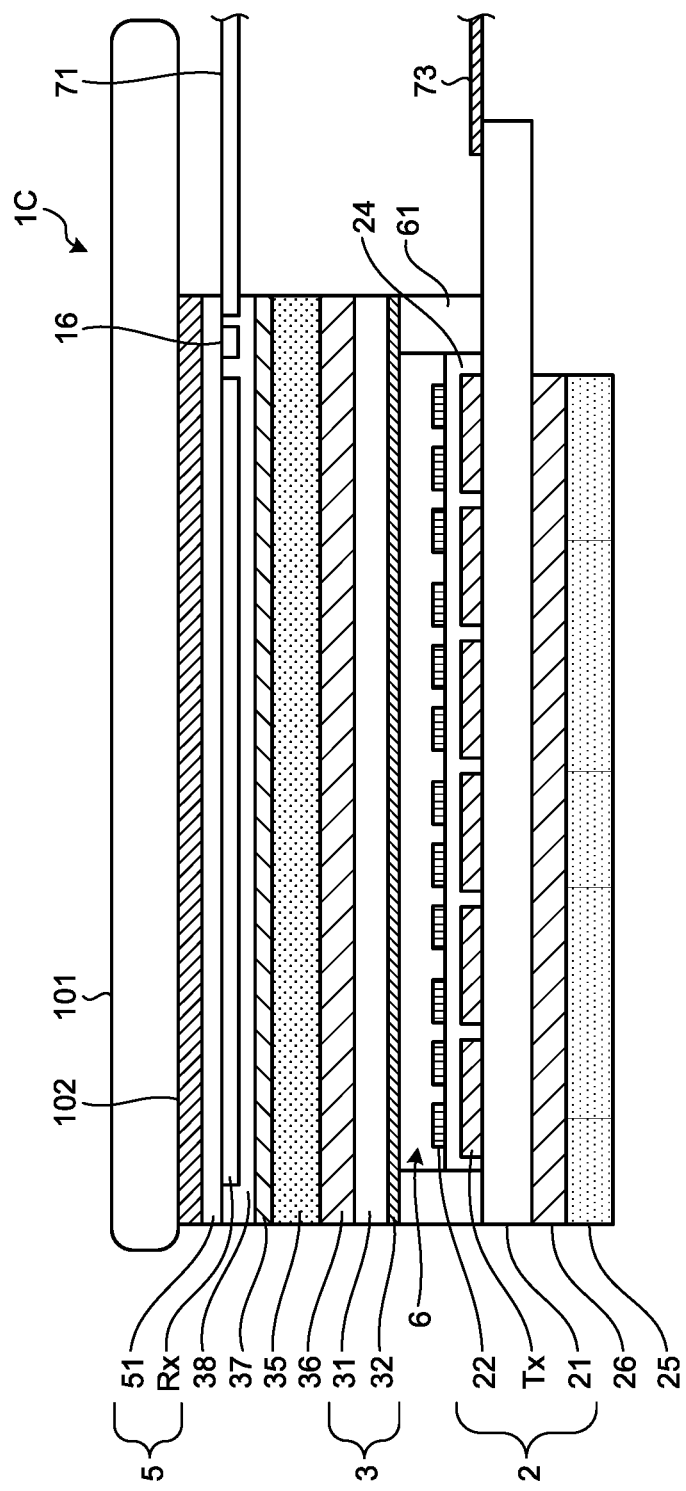
FIG. 16 is a cross-sectional view illustrating a schematic cross-sectional configuration of a display device according to a third modification of the first embodiment.

FIG. 16 is a cross-sectional view illustrating a schematic cross-sectional configuration of a display device according to a third modification of the first embodiment. As illustrated in FIG. 16, a display device 1C in the third modification further includes a cover substrate 101. The cover substrate 101 is provided above the polarizing plate 35. The sensor unit 5 is provided between the polarizing plate 35 and the cover substrate 101.

The second electrodes Rx and the second electrode selection circuit 16 are provided on one surface of the sensor base 51. The other surface of the sensor base 51 and the cover substrate 101 are bonded together with an adhesive layer 102 interposed therebetween such that the sensor base 51 is below the cover substrate 101. The protection layer 38 is provided to cover the second electrodes Rx and the second electrode selection circuit 16. The protection layer 38 and the polarizing plate 35 are bonded together with the adhesive layer 37 interposed therebetween. The polarizing plate 35 and the second substrate 31 are bonded together with the adhesive layer 36 interposed therebetween.

In other words, the first substrate 21, the first electrodes Tx, the second substrate 31, the polarizing plate 35, the second electrodes Rx, the sensor base 51, and the cover substrate 101 are provided in this order in the direction perpendicular to the second substrate 31. The cover substrate 101 may be provided to the display devices 1, 1A, and 1B.

A coating layer may be provided on the upper surface (the other surface) of the sensor base 51 without the cover substrate 101 being provided. In this case, the upper surface (the other surface) of the sensor base 51 serves as the detection surface. A target object such as a finger is in contact with or in proximity to the upper surface (the other surface) of the sensor base 51 with the coating layer interposed therebetween.

Second Embodiment

Figure 17:
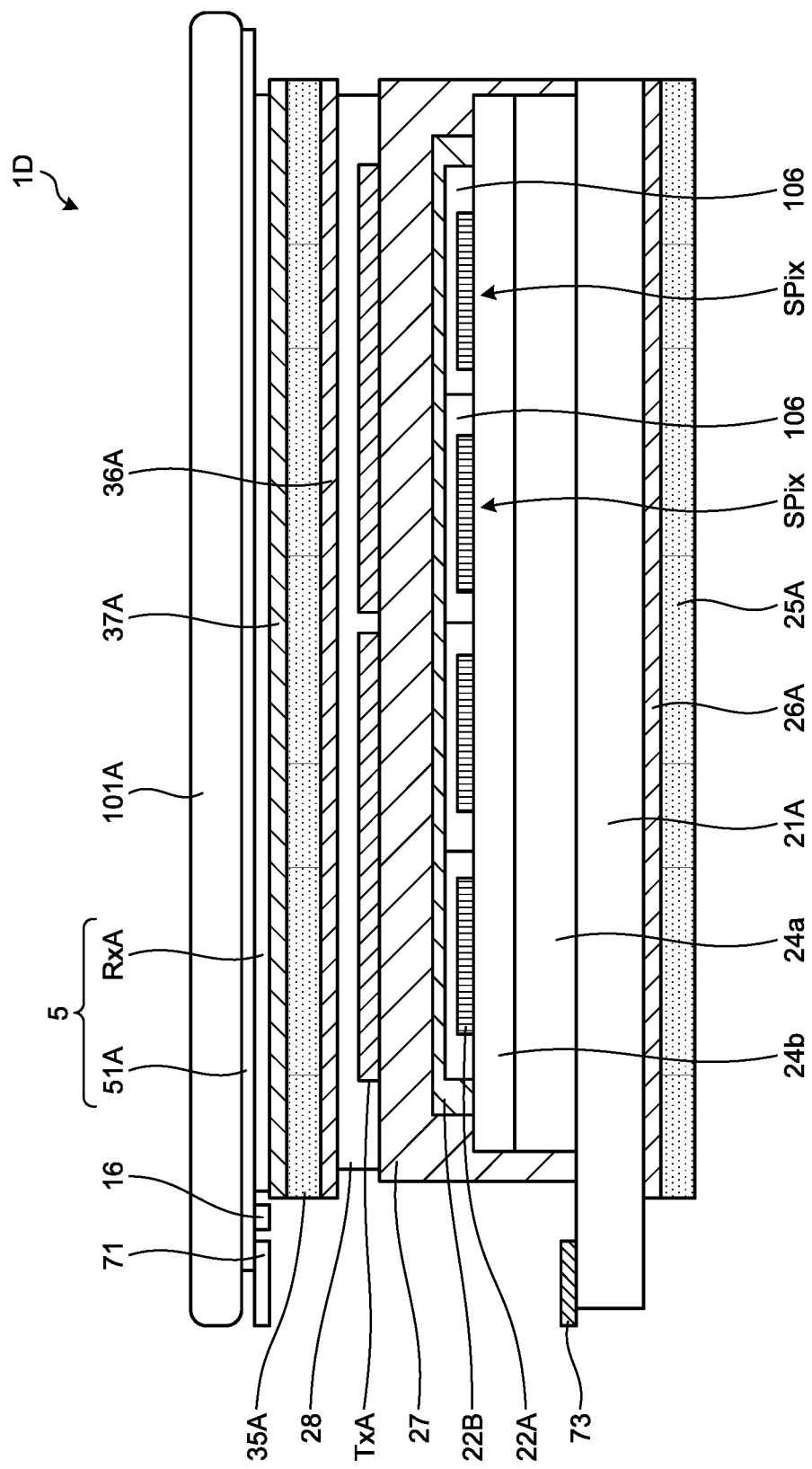
FIG. 17 is a cross-sectional view illustrating a schematic cross-sectional configuration of a display device according to a second embodiment.
Figure 18:
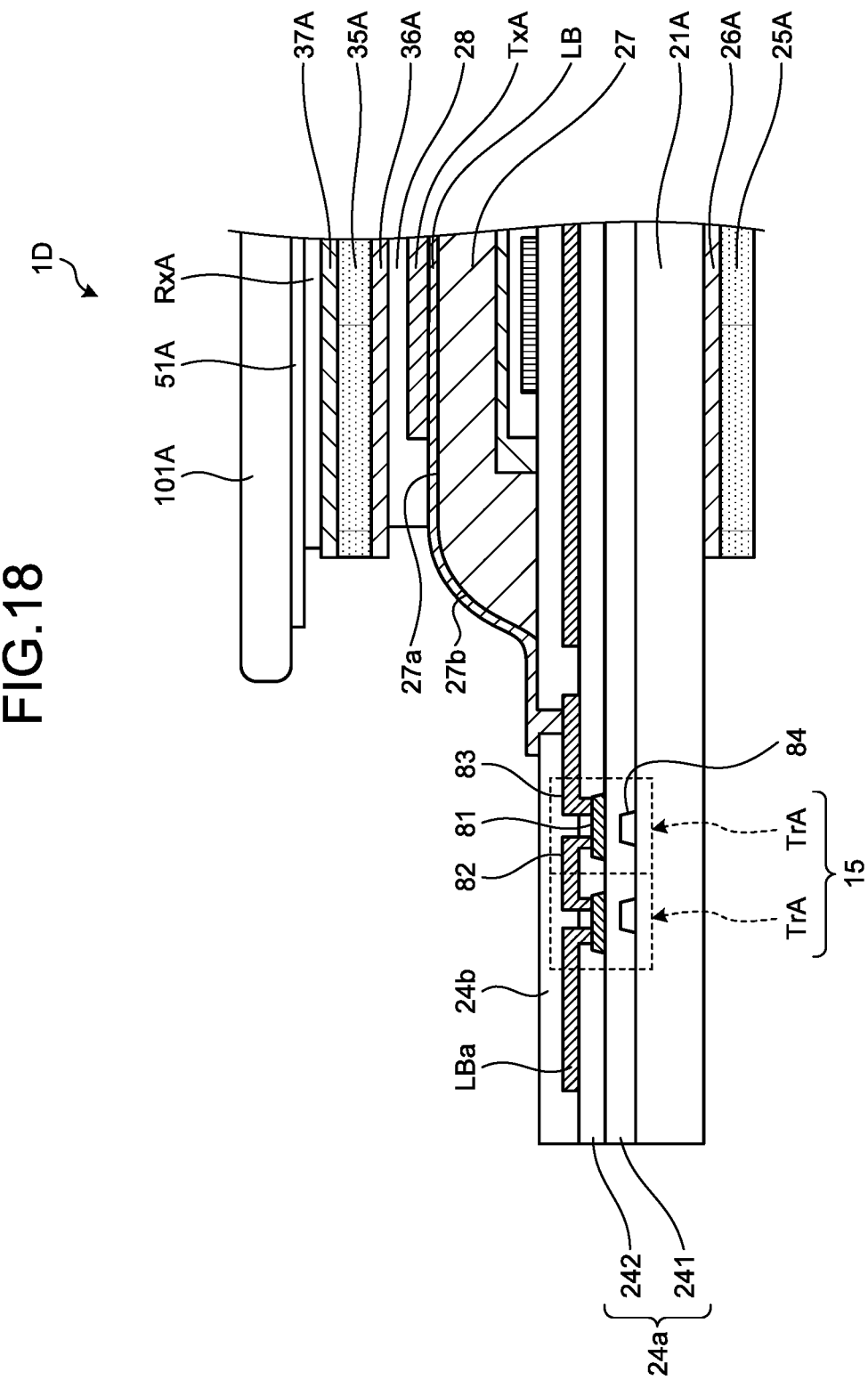
FIG. 18 is a diagram for explaining coupling between the first electrodes and the first electrode selection circuit.

FIG. 17 is a cross-sectional view illustrating a schematic cross-sectional configuration of a display device according to a second embodiment. FIG. 18 is a diagram for explaining coupling between the first electrodes and the first electrode selection circuit. In a display device 1D in the second embodiment, the display panel 20 (refer to FIG. 1) is an organic electroluminescence diode (OLED) display panel.

As illustrated in FIG. 17, the display device 1D includes a first substrate 21A, lower electrodes 22A, a self-luminous layer 106, an upper electrode 22B, a sealing layer 27, first electrodes TxA, polarizing plates 25A and 35A, the sensor unit 5, and a cover substrate 101A.

The lower electrodes 22A are provided above the first substrate 21A with insulation layers 24a and 24b interposed therebetween. The lower electrodes 22A are provided in a matrix (row-column configuration) so as to correspond to the respective sub-pixels SPix. The lower electrode 22A is an anode (positive pole) of an organic light-emitting diode. The polarizing plate 25A is provided below the first substrate 21A with an adhesive layer 26A interposed therebetween. The first substrate 21A can be made of a resin film such as a polyimide film. TFT elements (not shown) for driving the sub-pixels SPix are provided between the lower electrodes 22A and the first substrate 21A.

The upper electrode 22B is provided above the lower electrodes 22A. The self-luminous layer 106 serving as a display function layer is provided between the lower electrodes 22A and the upper electrode 22B. The upper electrode 22B is a cathode (negative pole) of the organic light-emitting diode. The lower electrode 22A and the upper electrode 22B are made of, for example, a conductive material having a light transmitting property such as ITO. The self-luminous layer 106 contains a polymer organic material and includes a hole injection layer, a hole transport layer, a luminescent layer, an electron transport layer, and an electron injection layer, which are not illustrated. The self-luminescent layer 106 is partitioned by a rib (insulation layer) for each of the sub-pixels SPix.

The sealing layer 27, which is an insulation layer, covers the upper electrode 22B. The sealing layer 27 seals the upper electrode 22B and the self-luminescent layer 106. The sealing layer 27 has a function to protect the upper electrode 22B and the self-luminescent layer 106.

With the configuration described above, light emitted from the self-luminescent layer 106 passes through the sealing layer 27 to reach observer's eyes. An image is displayed on a display surface by controlling an amount of light from the self-luminescent layer 106 for each sub-pixel SPix. In the self-luminescent layer 106, different luminescence materials are used for respective sub-pixel SPix to display colors of red (R), green (G), and blue (B). This allows the display device 1D to have the configuration without any color filter. However, the present disclosure is not limited thereto, and an identical luminescence material may be used for each sub-pixel SPix in the self-luminescent layer 106. In this case, a color filter is provided above the self-lumine scent layer 106.

The first electrodes TxA are provided on the sealing layer 27. The configuration of the first electrodes TxA in the plan view is identical to that of the first electrodes Tx illustrated in FIG. 4. The polarizing plate 35A is provided above the first electrodes TxA with a protection layer 28 and an adhesive layer 36A interposed therebetween.

The cover substrate 101A is provided above the polarizing plate 35A. The sensor unit 5 is provided between the polarizing plate 35A and the cover substrate 101A.

Second electrodes RxA and the second electrode selection circuit 16 are provided on one surface of a sensor base 51A. The other surface of the sensor base 51A and the cover substrate 101A are bonded together with an adhesive layer interposed therebetween such that the sensor base 51A is below the cover substrate 101A. The second electrodes RxA and the polarizing plate 35A are bonded together with an adhesive layer 37A interposed therebetween. The configuration of the second electrodes RxA in the plan view is identical to that of the second electrodes Rx illustrated in FIG. 5. That is, the second electrodes RxA intersect the first electrodes Tx in the plan view, thereby generating capacitance at each of intersections of the second electrodes RxA and the first electrodes TxA. The polarizing plate 35A and the protection layer 28 are bonded together with the adhesive layer 36A interposed therebetween.

In other words, the polarizing plate 35A is provided between the first substrate 21A and the sensor base 51A (second substrate). The cover substrate 101A is provided above the sensor base 51A. The second electrodes RxA are provided between the polarizing plate 35A and the sensor base 51A. In the display device 1D, the first substrate 21A, the self-luminescent layer 106, the upper electrode 22B, the sealing layer 27, the first electrodes TxA, the polarizing plate 35A, the second electrodes RxA, the sensor base 51A, and the cover substrate 101A are provided in this order in the direction perpendicular to the sensor base 51A. In the present embodiment, the display device 1D includes the first electrodes TxA and the upper electrode 22B. With this configuration, the first electrodes TxA do not have a function as the common electrode.

In the present embodiment, the second electrodes RxA are also provided to the substrate different from the first substrate 21A to which the first electrodes TxA are provided. The polarizing plate 35A is provided between the second electrodes RxA and the first electrodes TxA. That is, the distance between the second electrodes RxA and the first electrodes TxA is larger than that in a case where the second electrodes RxA and the first electrodes TxA are provided on an identical substrate. This configuration can prevent an increase in capacitance between the first electrodes TxA and the second electrodes RxA even when a multitude of second electrodes RxA are provided. Further, the sensor base 51A is bonded to the cover substrate 101A. The second electrodes Rx are provided at a position close to the target object such as a finger. Specifically, the polarizing plate 35A is not arranged between the second electrodes RxA and the target object such as a finger. This configuration makes it possible for the display device 1D to improve detection performance.

FIG. 18 is a cross-sectional view illustrating an enlarged part of the display device 1D. FIG. 18 illustrates TFT elements TrA included in the first electrode selection circuit 15. As illustrated in FIG. 18, the sealing layer 27 has an upper surface 27a and a tilted surface 27b. Wiring LB, which is provided on the upper surface 27a, is coupled to the first electrode TxA. The tilted surface 27b, which is formed on the outer edge of the sealing layer 27, couples the insulation layer 24b and the upper surface 27a. The wiring LB, which is provided on the upper surface 27a and the tilted surface 27b, is coupled to the TFT element TrA via a contact hole provided to the insulation layer 24b.

The TFT element TrA includes a semiconductor layer 81, a source electrode 82, a drain electrode 83, and a gate electrode 84. The gate electrode 84 is provided on the first substrate 21A. A first insulation layer 241 is provided on the first substrate 21A so as to cover the gate electrode 84. The semiconductor layer 81 is provided on the first insulation layer 241. A second insulation layer 242 is provided on the first insulation layer 241 to cover the semiconductor layer 81. The source electrode 82 and the drain electrode 83 are provided on the second insulating layer 242. The source electrode 82 and the drain electrode 83 are coupled to the semiconductor layer 81 via contact holes provided to the second insulation layer 242. The drain electrode 83 is coupled to the first electrode TxA via the wiring LB. The source electrode 82 is coupled to the flexible substrate 72 (refer to FIG. 17) via wiring LBa.

With this configuration, the first electrode TxA provided on the upper surface 27a of the sealing layer 27 is coupled to the first electrode selection circuit 15 via the wiring LB. The configuration of the TFT element TrA illustrated in FIG. 18 is merely an example, and may be changed as appropriate.

Third Embodiment

Figure 19:
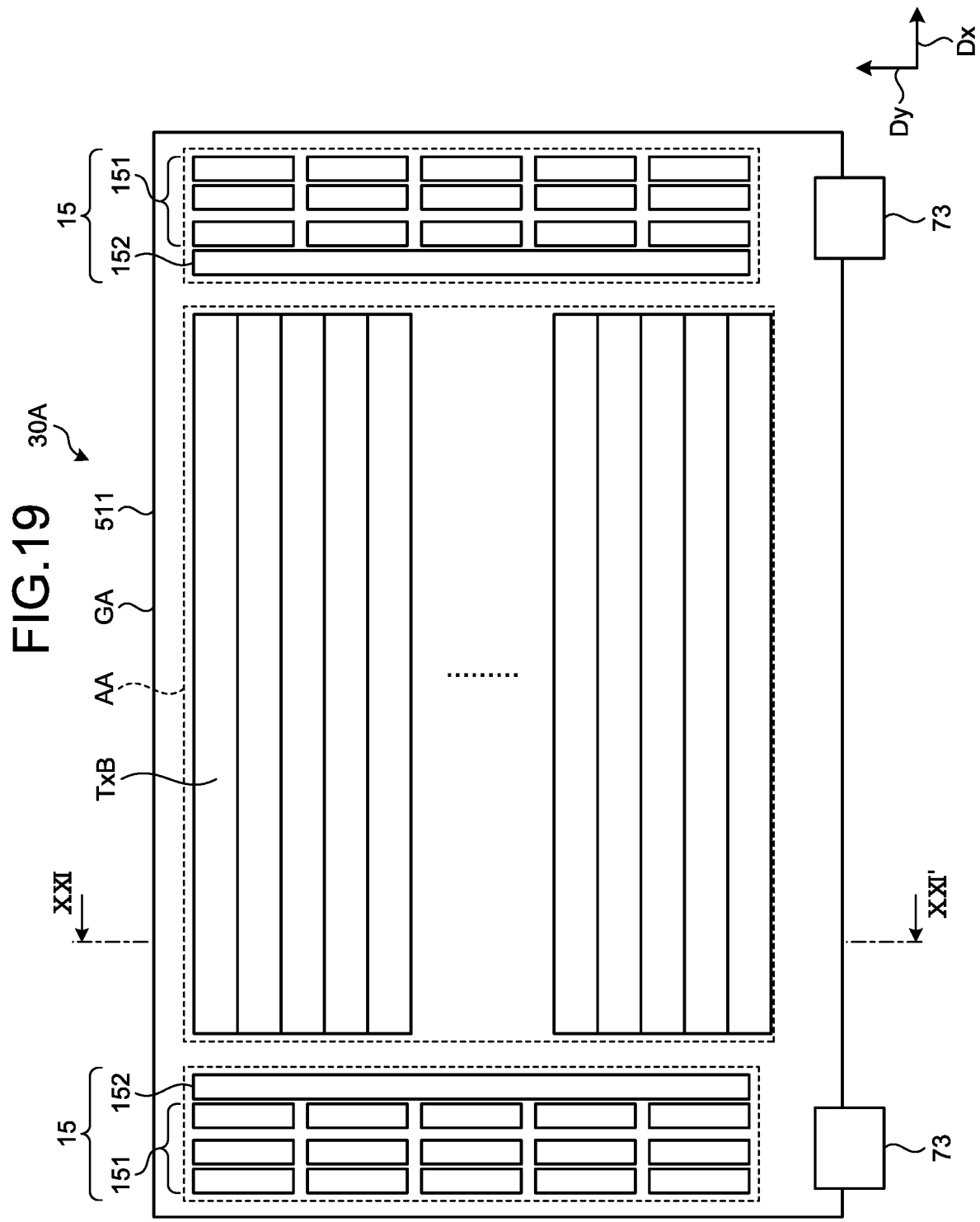
FIG. 19 is a plan view illustrating a first substrate of a detection device according to a third embodiment.
Figure 20:
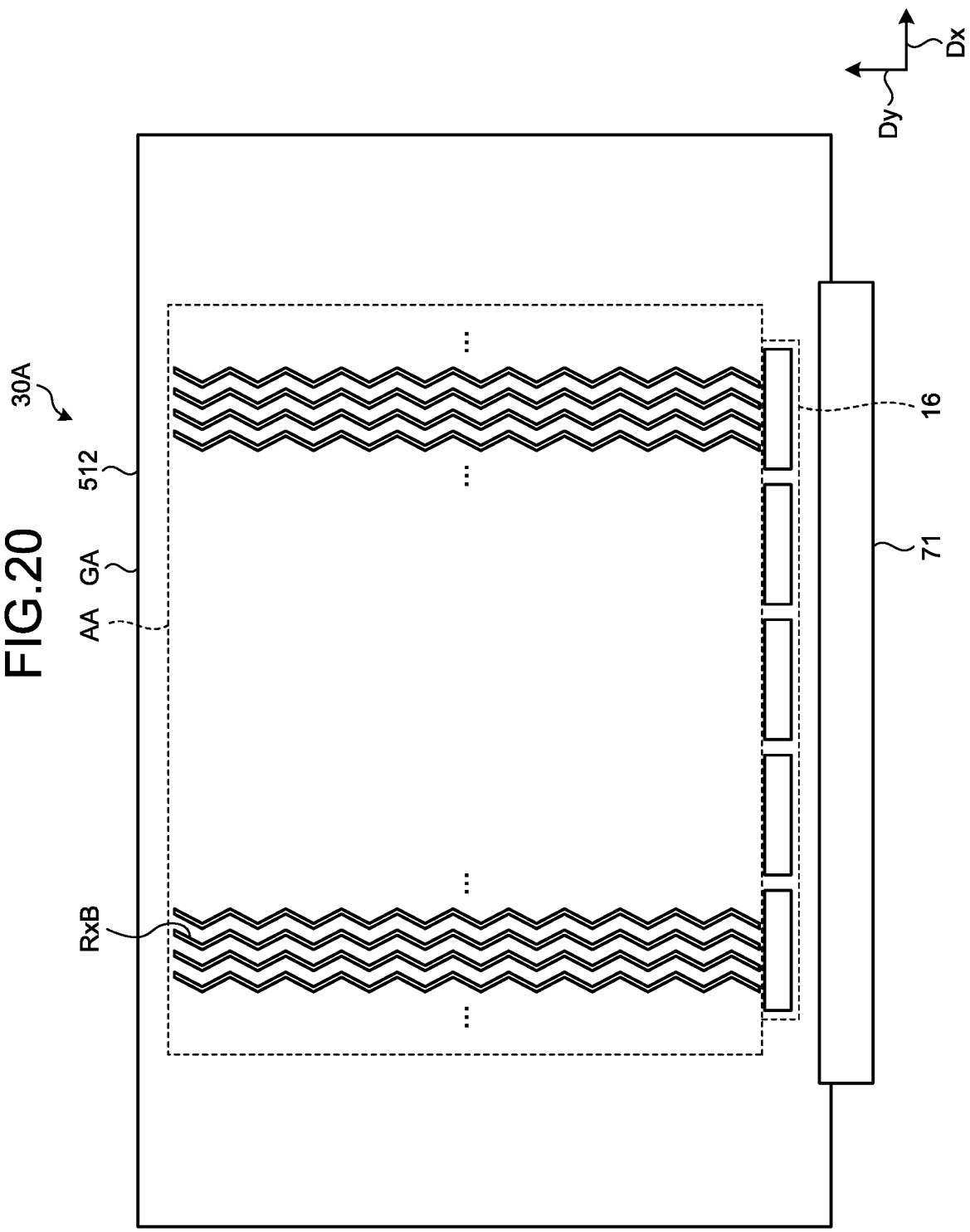
FIG. 20 is a plan view illustrating a second substrate of the detection device according to the third embodiment.
Figure 21:
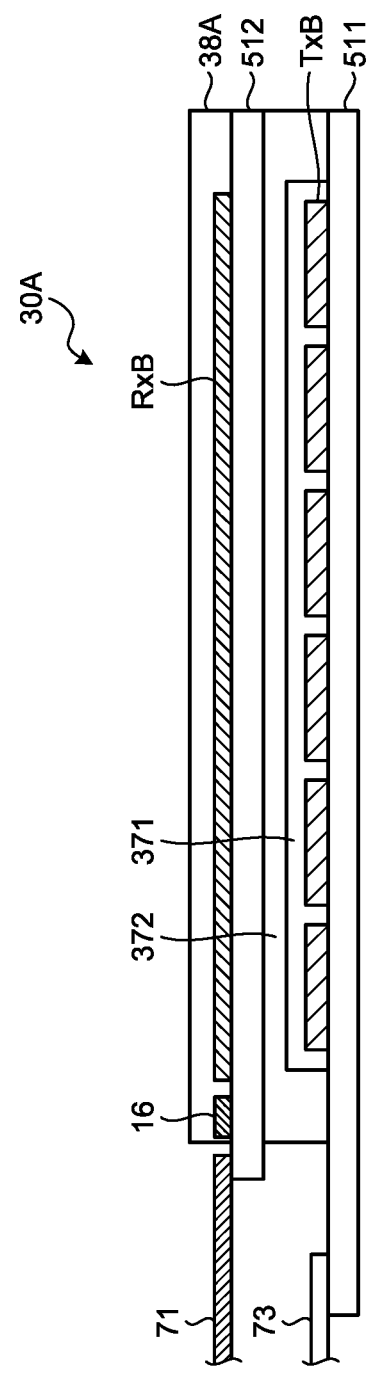
FIG. 21 is a cross-sectional view along line XXI-XXI' in FIG. 19 of the display device.

FIG. 19 is a plan view of a first substrate of a detection device according to a third embodiment. FIG. 20 is a plan view of a second substrate of the detection device according to the third embodiment. FIG. 21 is a cross-sectional view along line XXI-XXI' in FIG. 19 of the display device.

As illustrated in FIG. 21, a detection device 30A includes a first sensor base 511, a second sensor base 512, a plurality of first electrodes TxB, a plurality of second electrodes RxB, the first electrode selection circuits 15 (refer to FIG. 19), and the second electrode selection circuit 16.

The second sensor base 512 faces the first sensor base 511. The first sensor base 511 and the second sensor base 512 are glass substrates, resin substrates, or resin films. The first sensor base 511 and the second sensor base 512 are made of a material having a light transmitting property. With this configuration, the detection device 30A can be mounted on a display surface of a display device. The first sensor base 511 and the second sensor base 512 may be made of a material without light transmitting property. In this case, the detection device 30A can be mounted on a housing of an electronic apparatus such as the display device.

The first electrodes TxB are provided on one surface of the first sensor base 511. A protection layer 371 is provided on the first electrodes TxB. The second electrodes RxB are provided on one surface of the second sensor base 512. A protection layer 38A is provided on the second electrodes RxB. The first sensor base 511 and the second sensor base 512 are bonded together with an adhesive layer 372 interposed therebetween.

As illustrated in FIG. 19, the first electrodes TxB are provided in the detection region AA such that they extend in the first direction Dx and are arrayed in the second direction Dy. The first electrode selection circuits 15 are provided in the peripheral region GA. The first electrode selection circuit 15 selects a plurality of first electrodes TxB and supplies the drive signals Vcom having phases determined on the basis of the certain code to the respective first electrodes TxB. The first electrode selection circuit 15 is electrically coupled to the flexible substrate 73. The first electrodes TxB in the present embodiment and the first electrode selection circuit 15 are identical to the first electrodes Tx and the first electrode selection circuit 15 in the first embodiment. However, the first sensor base 511 is not provided with, for example, the pixel electrodes 22, the gate lines GCL, the signal lines SGL, and the flexible substrate 72, which are illustrated in FIG. 4.

As illustrated in FIG. 20, the second electrodes RxB are provided in the detection region AA such that they extend in the second direction Dy and are arrayed in the first direction Dx. The second electrode selection circuit 16 is provided in the peripheral region GA. The second electrode selection circuit 16 selects a plurality of second electrodes RxB on the basis of the certain code and couples the selected second electrodes RxB to the output signal line (the first output signal line LA1, refer to FIG. 11). The second electrode selection circuit 16 is electrically coupled to the flexible substrate 71. The second electrodes RxB and the second electrode selection circuit 16 in the present embodiment are identical to the second electrodes Rx and the second electrode selection circuit 16 in the first embodiment.

Also in the present embodiment, capacitance is generated at each of intersections of the first electrodes TxB and the second electrodes RxB. The first electrode selection circuit 15 selects the first electrodes TxB and supplies the drive signals Vcom to the selected first electrodes TxB simultaneously. The detection signals Vdet that correspond to changes in capacitance caused by ridges and valleys of a surface of a finger that is in contact with or in proximity to the detection device 30A are output from the second electrodes RxB, thereby performing fingerprint detection. The detection signals Vdet that correspond to changes in capacitance caused by ridges and valleys of a surface of a finger that is in contact with or in proximity to the detection device 30A are output from the second electrodes RxB, thereby performing touch detection. The detection device 30A in the present embodiment can also perform the CDM drive on the first electrodes TxB by the first electrode selection circuit 15 and the CDM drive on the second electrodes RxB by the second electrode selection circuit 16.

As illustrated in FIG. 21, the second electrodes RxB are provided to the second sensor base 512 that is different from the first sensor base 511 to which the first electrodes TxB are provided. With this configuration, the distance between the first electrodes TxB and the second electrodes RxB is larger than that in a case where the first electrodes TxB and the second electrodes RxB are provided on an identical substrate. This configuration can prevent an increase in capacitance between the first electrodes TxB and the second electrodes RxB even when a multitude of second electrodes RxB are provided. This configuration makes it possible for the display device 30A to improve detection performance.

Modification of Third Embodiment

Figure 22:
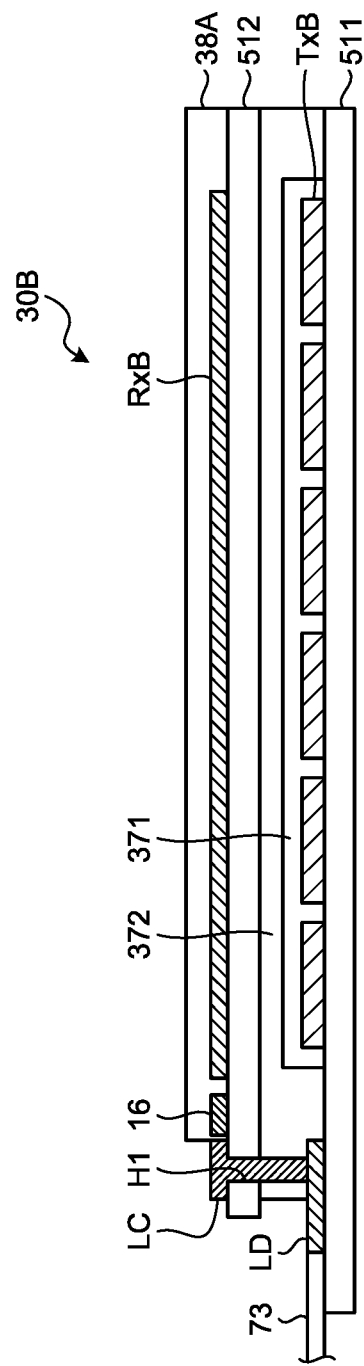
FIG. 22 is a cross-sectional view illustrating a schematic cross-sectional configuration of a display device according to a modification of the third embodiment.

FIG. 22 is a cross-sectional view illustrating a schematic cross-sectional configuration of a display device according to a modification of the third embodiment. In a detection device 30B in the present modification, the second sensor base 512 is not provided with the flexible substrate 71 (refer to FIG. 21). The second sensor base 512 in the modification is a glass substrate. The second sensor base 512 is provided with a contact hole H1 that is a through hole passing through the second sensor base 512 in the thickness direction thereof.

The second electrodes RxB are coupled to wiring LC via the second electrode selection circuit 16. The wiring LC is coupled to wiring LD provided on the first sensor base 511 via the contact hole H1. The wiring LD is electrically coupled to the flexible substrates 73. With this configuration, the first electrodes TxB and the second electrodes RxB can be coupled to the common flexible substrate 73.

Having described the preferred embodiments of the disclosure, the disclosure is not limited to the embodiments described above. The disclosed contents in the embodiments are examples. The embodiments can be modified various ways without departing from the spirit of the disclosure. The appropriate modifications performed without departing from the spirit of the disclosure also belong to the technical scope of the disclosure. At least one of omission, replacement, or modification of the constituent elements can be performed in various ways without departing from the scope of the embodiments and the modifications described above.

The display device and the detection device according to an aspect of the disclosure can include the following aspects, for example.

(1) A display device comprising:
 a first substrate;
 a second substrate facing the first substrate;
 a display function layer provided between the first substrate and the second substrate and displaying an image;
 a plurality of first electrodes provided in a detection region of the first substrate;
 a plurality of second electrodes provided in the detection region above the second substrate;
 a first electrode selection circuit provided in a peripheral region outside the detection region of the first substrate; and
 a second electrode selection circuit provided in a region overlapping with the peripheral region above the second substrate, wherein
 the first electrode selection circuit selects some of the first electrodes, and supplies detection drive signals having phases determined on the basis of a certain code to the selected first electrodes, and
 the second electrode selection circuit selects some of the second electrodes on the basis of a certain code, and couples the selected second electrodes to a single output signal line.

(2) The display device according to (1), further comprising a polarizing plate provided above the second substrate, wherein
 the second substrate is provided with the second electrodes and the second electrode selection circuit, and
 the second electrodes are arranged between the second substrate and the polarizing plate in a direction perpendicular to the second substrate.

(3) The display device according to (1), further comprising:
 a polarizing plate provided above the second substrate; and
 a sensor base provided with the second electrodes and the second electrode selection circuit.

(4) The display device according to (3), wherein
the first substrate, the first electrodes, the second substrate, the sensor base, the second electrodes, and the polarizing plate are provided in this order in a direction perpendicular to the second substrate.

(5) The display device according to (3), wherein
the first substrate, the first electrodes, the second substrate, the polarizing plate, the sensor base, and the second electrodes are provided in this order in a direction perpendicular to the second substrate.

(6) The display device according to (3), further comprising
a cover substrate provided above the polarizing plate, wherein
the first substrate, the first electrodes, the second substrate, the polarizing plate, the second electrodes, the sensor base, and the cover substrate are provided in this order in a direction perpendicular to the second substrate.

(7) The display device according to (6), wherein the sensor base and the cover substrate are bonded together with an adhesive layer interposed between the sensor base and the cover substrate.

(8) The display device according to any one of (1) to (7), wherein
the display function layer is a liquid crystal layer, and
a display drive signal having a potential common to a plurality of pixels is supplied to the first electrodes.

(9) The display device according to (1), further comprising:
an upper electrode provided above the display function layer, the display function layer being a self-luminescent layer containing an organic polymer material; and
a sealing layer sealing the self-luminescent layer and the upper electrode, wherein the first electrodes are provided on the sealing layer.

(10) The display device according to (9), further comprising:
a polarizing plate provided between the first substrate and the second substrate; and
a cover substrate provided above the second substrate, wherein
the second substrate is provided with the second electrodes and the second electrode selection circuit.

(11) The display device according to (10), wherein
the first substrate, the self-luminescent layer, the upper electrode, the sealing layer, the first electrodes, the polarizing plate, the second electrodes, the second substrate, and the cover substrate are provided in this order in a direction perpendicular to the second substrate.

(12) The display device according to any one of (9) to (11), wherein
the first electrodes are electrically coupled to the first electrode selection circuit via wiring provided on the sealing layer.

(13) The display device according to any one of (1) to (12), further comprising a first analog front end circuit coupled to the output signal line.

(14) The display device according to (13), further comprising a second analog front end circuit, wherein
non-selected second electrodes that are not coupled to the first analog front end circuit among the second electrodes are coupled to the second analog front end circuit.

(15) A detection device comprising:
a first sensor base;
a second sensor base facing the first sensor base;
a plurality of first electrodes provided in a detection region of the first sensor base;
a plurality of second electrodes provided in the detection region of the second sensor base;
a first electrode selection circuit provided in a peripheral region outside the detection region of the first sensor base; and
a second electrode selection circuit provided in the peripheral region of the second sensor base, wherein
the first electrode selection circuit selects some of the first electrodes, and supplies drive signals having phases determined on the basis of a certain code to the selected first electrodes, and
the second electrode selection circuit selects some of the second electrodes on the basis of a certain code, and couples the selected second electrodes to a single output signal line.

(16) The detection device according to (15), wherein
a through hole is provided in the peripheral region of the second sensor base, and
each of the second electrodes is coupled to wiring provided to the first sensor base via the through hole.

What is claimed is:

1. A display device comprising:
a first substrate;
a second substrate facing the first substrate;
a display function layer provided between the first substrate and the second substrate and displaying an image;
a plurality of first electrodes provided in a detection region of the first substrate;
a plurality of second electrodes provided in the detection region above the second substrate;
a first electrode selection circuit provided in a peripheral region outside the detection region of the first substrate;
a second electrode selection circuit provided in a region overlapping with the peripheral region above the second substrate;
a first analog front end circuit; and
a gate line selection circuit selecting a gate line,
wherein
the first electrode selection circuit selects some of the first electrodes, and supplies detection drive signals having phases determined on the basis of a certain code to the selected first electrodes,
the second electrode selection circuit selects some of the second electrodes on the basis of a certain code, and couples the selected second electrodes to a single output signal line,
the gate line selection circuit is disposed in the peripheral region between the first electrode selection circuit and the first electrodes in a direction along a longitudinal direction of the respective first electrodes, and
the first analog front end circuit is coupled via a single first output signal line to first-selected second electrodes each selectively coupled to the single first output signal line by operations of switches.

2. The display device according to claim 1, further comprising a polarizing plate provided above the second substrate, wherein
the second substrate is provided with the second electrodes and the second electrode selection circuit, and
the second electrodes are arranged between the second substrate and the polarizing plate in a direction perpendicular to the second substrate.

3. The display device according to claim 1, further comprising:
a polarizing plate provided above the second substrate; and
a sensor base provided with the second electrodes and the second electrode selection circuit.

4. The display device according to claim 3, wherein
the first substrate, the first electrodes, the second substrate, the sensor base, the second electrodes, and the polarizing plate are provided in this order in a direction perpendicular to the second substrate.

5. The display device according to claim 3, wherein
the first substrate, the first electrodes, the second substrate, the polarizing plate, the sensor base, and the second electrodes are provided in this order in a direction perpendicular to the second substrate.

6. The display device according to claim 3, further comprising a cover substrate provided above the polarizing plate, wherein
the first substrate, the first electrodes, the second substrate, the polarizing plate, the second electrodes, the sensor base, and the cover substrate are provided in this order in a direction perpendicular to the second substrate.

7. The display device according to claim 6, wherein
the sensor base and the cover substrate are bonded together with an adhesive layer interposed between the sensor base and the cover substrate.

8. The display device according to claim 1, wherein
the display function layer is a liquid crystal layer, and
a display drive signal having a potential common to a plurality of pixels is supplied to the first electrodes.

9. The display device according to claim 1, further comprising:
an upper electrode provided above the display function layer, the display function layer being a self-luminescent layer containing an organic polymer material; and
a sealing layer sealing the self-luminescent layer and the upper electrode, wherein
the first electrodes are provided on the sealing layer.

10. The display device according to claim 9, further comprising:
a polarizing plate provided between the first substrate and the second substrate; and
a cover substrate provided above the second substrate, wherein
the second substrate is provided with the second electrodes and the second electrode selection circuit.

11. The display device according to claim 10, wherein
the first substrate, the self-luminescent layer, the upper electrode, the sealing layer, the first electrodes, the polarizing plate, the second electrodes, the second substrate, and the cover substrate are provided in this order in a direction perpendicular to the second substrate.

12. The display device according to claim 9, wherein
the first electrodes are electrically coupled to the first electrode selection circuit via wiring provided on the sealing layer.

13. The display device according to claim 1, further comprising a second analog front end circuit and a single second output signal line, wherein
the second analog front end circuit is coupled via the single second output signal line to second-selected second electrodes each selectively coupled to the single second output signal line by operations of the switches, and
the second-selected second electrodes are the second electrodes other than the first-selected electrodes among the second electrodes.

14. A detection device comprising:
a first sensor base;
a second sensor base facing the first sensor base;
a plurality of first electrodes provided in a detection region of the first sensor base;
a plurality of second electrodes provided in the detection region of the second sensor base;
a first electrode selection circuit provided in a peripheral region outside the detection region of the first sensor base; and
a second electrode selection circuit provided in the peripheral region of the second sensor base;
a first analog front end circuit; and
a gate line selection circuit selecting a gate line,
wherein
the first electrode selection circuit selects some of the first electrodes, and supplies drive signals having phases determined on the basis of a certain code to the selected first electrodes,
the second electrode selection circuit selects some of the second electrodes on the basis of a certain code, and couples the selected second electrodes to a single output signal line,
the gate line selection circuit is disposed in the peripheral region between the first electrode selection circuit and the first electrodes in a direction along a longitudinal direction of the respective first electrodes, and
the first analog front end circuit is coupled via a single first output signal line to first-selected second electrodes each selectively coupled to the single first output signal line by operations of switches.

15. The detection device according to claim 14, wherein
a through hole is provided in the peripheral region of the second sensor base, and
each of the second electrodes is coupled to wiring provided to the first sensor base via the through hole.

16. A display device comprising:
a first substrate;
a second substrate facing the first substrate;
a display function layer provided between the first substrate and the second substrate and displaying an image;
a plurality of first electrodes provided in a detection region of the first substrate;
a plurality of second electrodes provided in the detection region above the second substrate;
a first electrode selection circuit provided in a peripheral region outside the detection region of the first substrate;
a second electrode selection circuit provided in a region overlapping with the peripheral region above the second substrate;
a gate line selection circuit selecting a gate line; and
a flexible substrate coupled with the second electrodes via the second electrode selection circuit, wherein
the first electrode selection circuit selects some of the first electrodes, and supplies detection drive signals having phases determined on the basis of a certain code to the selected first electrodes,
the second electrode selection circuit selects some of the second electrodes on the basis of a certain code, and couples the selected second electrodes to a single output signal line,
the gate line selection circuit is disposed in the peripheral region between the first electrode selection circuit and the first electrodes in a direction along a longitudinal direction of the respective first electrodes, and the second electrode selection circuit is disposed above the second substrate between the flexible substrate and the second electrodes in a direction along a longitudinal direction of the respective second electrodes.

* * * * *